United States Patent
Kagotani et al.

(10) Patent No.: US 11,247,505 B2
(45) Date of Patent: Feb. 15, 2022

(54) OPTICAL STRUCTURE AND AUTHENTICATION BODY

(71) Applicant: TOPPAN PRINTING CO., LTD., Tokyo (JP)

(72) Inventors: Akihito Kagotani, Tokyo (JP); Kazuhiro Yashiki, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 91 days.

(21) Appl. No.: 16/752,108

(22) Filed: Jan. 24, 2020

(65) Prior Publication Data
US 2020/0156399 A1 May 21, 2020

Related U.S. Application Data

(63) Continuation of application No. PCT/JP2018/028161, filed on Jul. 26, 2018.

(30) Foreign Application Priority Data

Jul. 26, 2017 (JP) .............................. JP2017-144769
Dec. 27, 2017 (JP) .............................. JP2017-252240

(51) Int. Cl.
*B42D 25/328* (2014.01)
*G02B 5/18* (2006.01)
(Continued)

(52) U.S. Cl.
CPC ......... *B42D 25/328* (2014.10); *G02B 5/1842* (2013.01); *G02B 5/1861* (2013.01); *B42D 25/373* (2014.10); *B42D 25/378* (2014.10)

(58) Field of Classification Search
CPC .. B42D 25/328; B42D 25/373; B42D 25/378; G02B 5/1842; G02B 5/1861; G02B 5/32;
(Continued)

(56) References Cited

U.S. PATENT DOCUMENTS 4,846,552 A * 7/1989 Veldkamp ............ G02B 5/1809
359/572
6,695,905 B2 2/2004 Rozumek et al.
(Continued)

FOREIGN PATENT DOCUMENTS

JP 2005-215570 8/2005
JP WO 2007/131375 11/2007
(Continued)

OTHER PUBLICATIONS

PCT Forms PCT/IB/338; PCT/IB/373; PCT/ISA/237; Written Opinion of the International Searching Authority dated Oct. 30, 2018 in PCT Application No. PCT/JP2018/028161 (13 pages).
(Continued)

*Primary Examiner* — Justin V Lewis

(57) ABSTRACT

There is provided an optical structure having a quantization phase difference structure on one surface of a quantization phase difference structure layer, wherein in the quantization phase difference structure, a plurality of quantization projecting portions in a constant size and a plurality of quantization recessed portions in a constant size are aligned, wherein a multiple diffraction region has the quantization phase difference structure where ribbed projecting portions, in which the quantization projecting portions are aligned in one direction, are arranged adjacent to and alternately with groove-like recessed portions, in which the quantization recessed portions are aligned parallel to the ribbed projecting portions, and wherein the multiple diffraction region is a quantization phase difference structure configured to reproduce a plurality of reproduction points discrete in one direction and arranged regularly.

12 Claims, 15 Drawing Sheets

(51) Int. Cl.
  *B42D 25/373* (2014.01)
  *B42D 25/378* (2014.01)
  *G03H 1/00* (2006.01)
  *G03H 1/30* (2006.01)
  *G03H 1/02* (2006.01)
  *G02B 5/32* (2006.01)

(58) Field of Classification Search
  CPC .... G02B 5/18; G03H 1/0011; G03H 2210/45; G03H 2250/36; G03H 1/30; G03H 1/0244; G03H 1/00; G03H 1/02
  USPC ................................. 283/72, 73, 94, 98, 901
  See application file for complete search history.

(56) References Cited

U.S. PATENT DOCUMENTS

| | | |
|---|---|---|
| 8,840,146 B2 | 9/2014 | Stalder |
| 10,350,843 B2 | 7/2019 | Stalder |
| 2003/0015123 A1 | 1/2003 | Rozumek et al. |
| 2005/0206996 A1 | 9/2005 | Kitamura |
| 2009/0179418 A1 | 7/2009 | Stalder |
| 2014/0106091 A1 | 4/2014 | Stalder |
| 2019/0094802 A1 | 3/2019 | Kagotani |

FOREIGN PATENT DOCUMENTS

| | | |
|---|---|---|
| JP | 2009-237457 | 10/2009 |
| JP | 2011-118034 | 6/2011 |
| JP | 4916636 | 4/2012 |
| JP | 2012-252306 | 12/2012 |
| JP | 2014-47284 | 3/2014 |
| JP | 2014-215619 | 11/2014 |
| JP | 2017-13474 | 1/2017 |
| JP | WO 2017/209113 | 12/2017 |

OTHER PUBLICATIONS

International Search report dated Oct. 30, 2018, in corresponding International Patent Application No. PCT/JP2018/028161.
Written Opinion of the International Searching Authority dated Oct. 20, 2018, in corresponding International Patent Application No. PCT/JP2018/028161.
Extended European Search Report dated Jul. 17, 2020, in corresponding European Patent Application No. 18838018.2.

\* cited by examiner

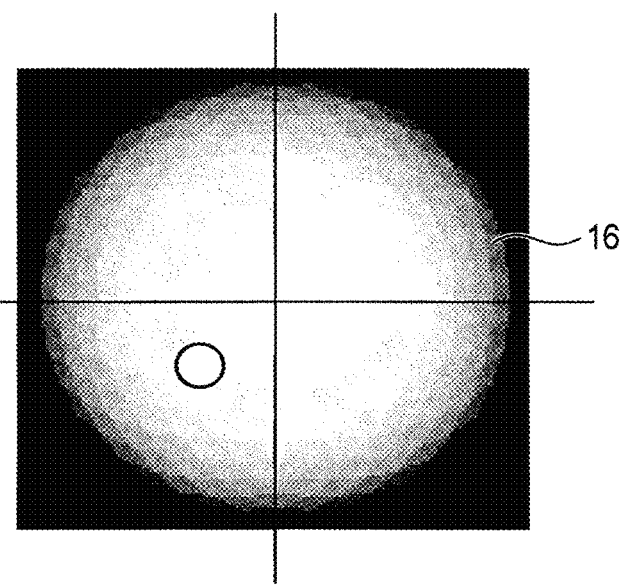
F I G. 4A
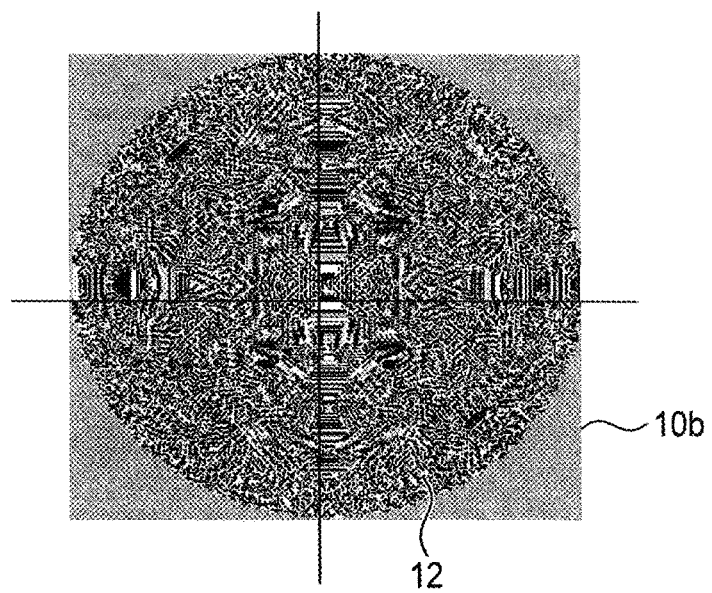
F I G. 4B
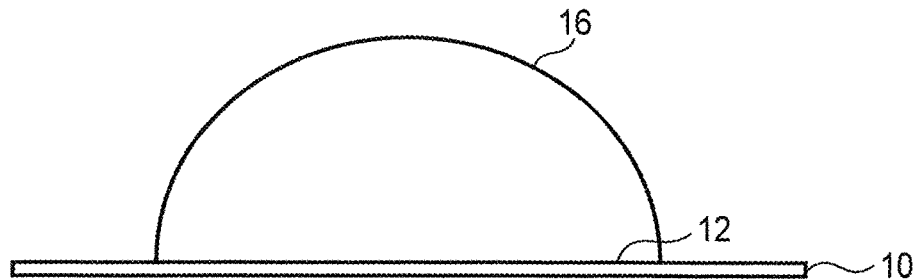
F I G. 4C

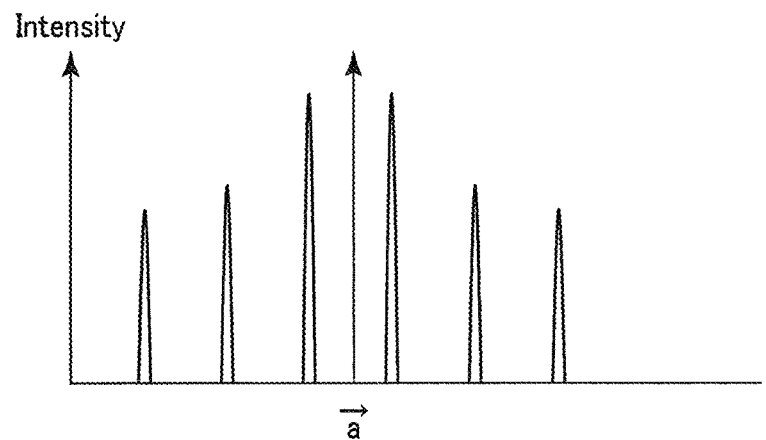
F I G. 6C
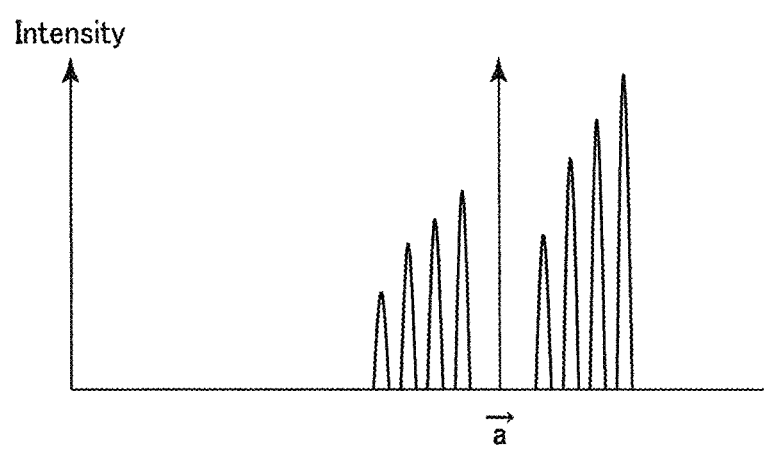
F I G. 6D

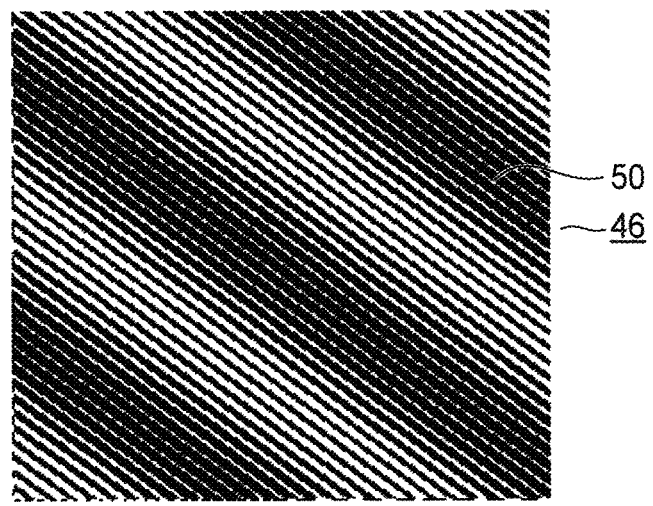
F I G. 11A
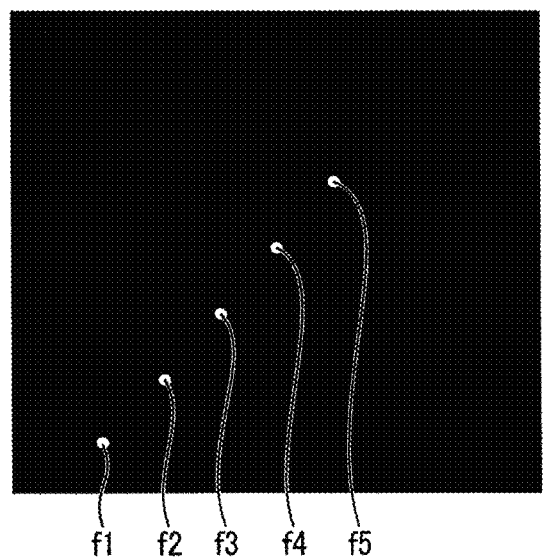
F I G. 11B

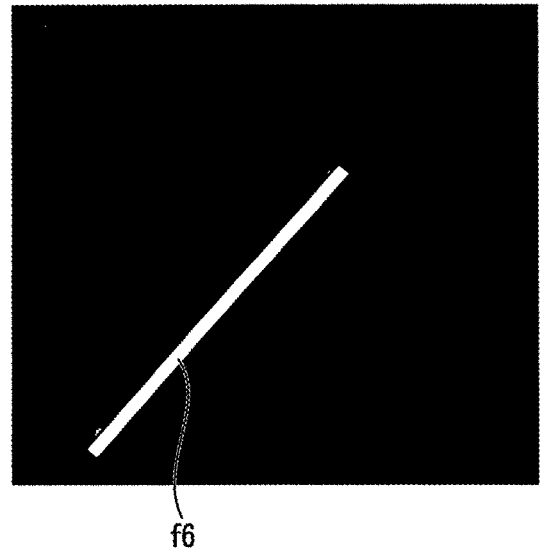
F I G. 12A
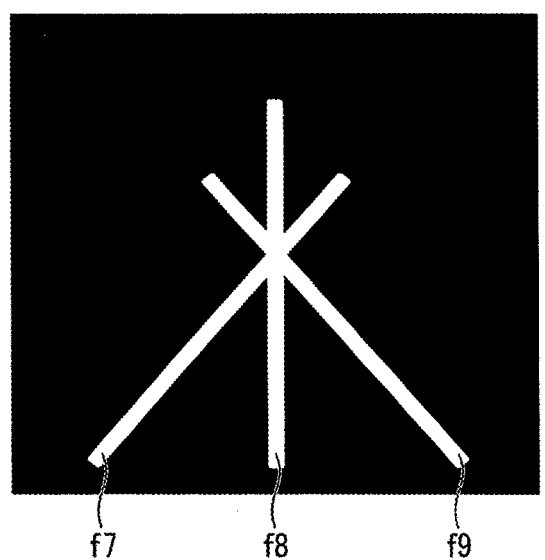
F I G. 12B

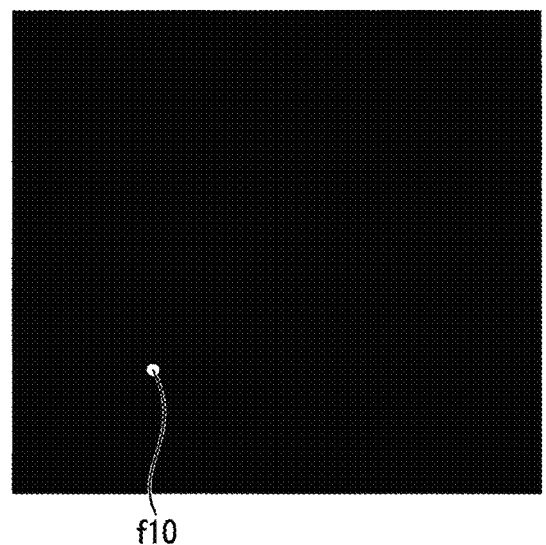
F I G. 12C

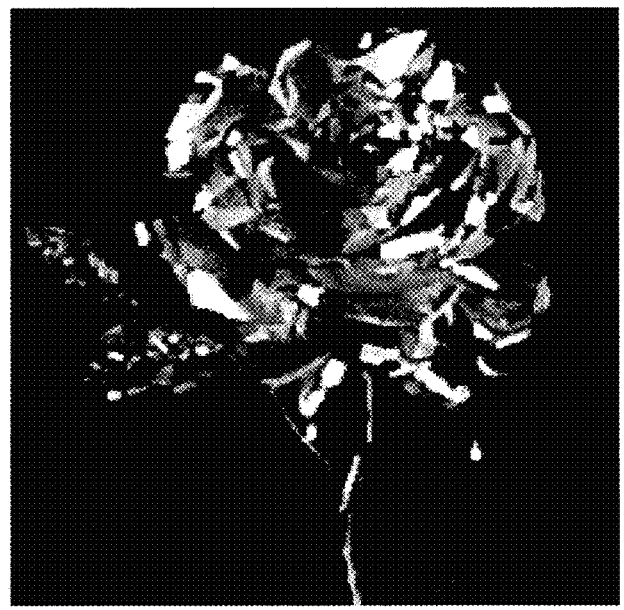
F I G. 15

OPTICAL STRUCTURE AND AUTHENTICATION BODY

CROSS-REFERENCE TO RELATED APPLICATIONS

This application is a Continuation Application of PCT Application No. PCT/JP2018/028161, filed Jul. 26, 2018 and based upon and claiming the benefit of priority from Japanese Patent Applications No. 2017-144769, filed Jul. 26, 2017 and No. 2017-252240, filed Dec. 27, 2017, the entire contents of all of which are incorporated herein by reference.

FIELD

The embodiment of the present invention relates to an optical structure applied as means for preventing forgery of securities and card media or of passports, visas, etc. for improving security, and relates to an authentication body including the optical structure.

BACKGROUND

Conventionally, three-dimensional expression provided by the holographic technique is applied as forgery prevention means to improve security, such as a computer-generated hologram of which a light wave front is computed by a computing device, in particular.

A computer-generated hologram can be emboss-molded for duplication. Since development processing is not necessary in this case, the computer-generated hologram is a commercially excellent technique.

For example, Patent Literature 1 (Jpn. Pat. Appln. KOKAI Publication No. 2011-118034) discloses a method of showing a phantom three-dimensional object as a solid body by using anisotropic scattering of light.

SUMMARY

However, according to the method disclosed in the Patent Literature 1, if light is incident on an inclined surface that is pseudo-stereoscopic, shading of light switches for each inclined surface although it lacks a stereoscopic effect.

If the apparent size of a light source of reference light irradiated on a hologram is large, a three-dimensional reproduced image is blurred.

In order to remedy these disadvantages, it is necessary to restrict observation conditions such as the size of the light source and the wavelength of the light source when observing a hologram. However, this imposes a strain on the observer.

Furthermore, in the computer hologram formed of a general kinoform, because of the thin groove-like diffraction grating structure on the surface, color shift is caused due to a viewing angle if the computer hologram is reproduced with a white light in which multiple wavelengths are mixed, and an iridescent diffraction light may be obtained by diffraction in an angle determined accordance with a wavelength. This is because if a white incident light is incident, the incident light is diffracted by the structure of the equal pitch of diffraction grating, and rays of the diffraction light with different wavelengths proceed in different directions.

Security labels for forming a hologram image, for example, is commercialized by using this rainbow color. For example, according to the conventional diffraction grating pattern, the color changes in an iridescent manner based on the positional relationship between an illumination, a display, and an observer.

However, holograms that appear rainbow color can be easily manufactured in recent years, and do not have a sufficient forgery prevention ability any more. Accordingly, needs for expressions in place of the rainbow color have become a market trend.

Thus, the computer hologram formed of a general kinoform cannot be applied for preventing forgery of, for example, securities such as gift vouchers, card media such as credit cards, passport and visa, etc., brand-name products, and equipment components.

Moreover, the hologram entails a characteristic blur. In recent years, there is a technique for eliminating a dynamic visual effect so as to reduce the blur; however, in this case, there is a problem of it lacking any difference from general printed materials since an image of an object does not change at all despite change in visual angle.

As described above, the computer hologram formed of a general kinoform cannot be applied for preventing forgery of, for example, securities such as gift vouchers, card media such as credit cards, passports and visas, etc., brand-name products, and equipment components; accordingly, an ink, in addition to a hologram, is generally used for authentication of these.

An ink of this type is required to have high durability so that the ink can be used without fading even over an extended period of time. Moreover, the ink preferably does not have a color-shift effect in a specific direction, so that its color tone does not change when seen from any direction.

Patent Literature 2 (Japanese Patent No. 4916636) is disclosed as a conventional technique related to durability improvement of an ink. Patent Literature 2 discloses a pigment of which color-shift effect is reduced by providing two reflection layers and using an interference color.

However, if a reflection layer is formed into a pigment and the pigment is used in printing, an inclination angle of the pigment is random upon printing, and its color tone in a specific direction is mixed depending on the direction in which the pigment is fixed. This makes it difficult to produce a color with high saturation.

There is a problem that if the orientation is controlled by a magnetic field and printing is performed, a color-shift effect is strongly expressed in a multi-layer film as a film before being formed into a pigment, and the color gradually varies in accordance with a radiation angle of the light; accordingly, there is a problem that it is difficult to determine which color is the true color. A similar problem occurs in a case of a structural color obtained by using a general quantization phase difference structure, since many of such colors have a strong color-shift effect.

To sum up, a hologram with diffraction grating has an advantage that an image with a high brightness can be obtained which leads to a high eye-catching effect, and a disadvantage that the color largely changes in accordance with an angle of the label and the color development is unstable.

Another known technique aims to realize a own color development by interference between the flat upper surface of a projecting portion and a flat surface other than the projecting portion, and to stabilize color development by scattering light at the projecting portion. The color development of interference between the flat upper surface of a projecting portion and a flat surface other than the projecting portion has an advantage that a color shift arising due to difference in viewpoint or location of light source is small, which provides a stable color development, and a disadvantage that stable color development necessarily involves wide diffusion, which reduces brightness. Reduction of the brightness may cause reduction of the eye-catching effect.

The embodiments of the present invention are contrived in light of such conditions, and can overcome the color instability and reduction of brightness as defects of a conventional technique such as diffraction and interference by application of the kinoform technique. One of the objectives thereof is to provide an optical structure and an authentication body that includes the optical structure, wherein the optical structure can enable three-dimensional expression regardless of a light source, improve the visual quality of the iridescent color, and obtain a sparkling and blinking appearance similar to jewels in accordance with a visual angle, when displaying graphic information such as a picture or character information as forgery prevention means to improve security of, for example, securities and card media, or passports and visas.

The other objective is to be applied to an ink preferably applied to printed materials such as securities and card media, or passports and visas, so that the ink has high durability, and to apply a kinoform which enables high brightness expression so as to provide an optical structure without a color-shift effect.

In order to achieve the above objectives, the embodiments of the present invention take the measures below.

According to a certain aspect, an optical structure has a quantization phase difference structure on one surface of a quantization phase difference structure layer, wherein in the quantization phase difference structure, a plurality of quantization projecting portions in a constant size and a plurality of quantization recessed portions in a constant size are aligned, wherein a multiple diffraction region has the quantization phase difference structure where ribbed projecting portions, in which the quantization projecting portions are aligned in one direction, are arranged adjacent to and alternately with groove-like recessed portions, in which the quantization recessed portions are aligned parallel to the ribbed projecting portions, and wherein the multiple diffraction region is a quantization phase difference structure configured to reproduce a plurality of reproduction points discrete in one direction and arranged regularly.

According to the optical structure, surface roughness of a bottom surface of the quantization recessed portions of the quantization phase difference structure is different from surface roughness of a top surface of the quantization recessed portions of the quantization phase difference structure.

According to the optical structure, a plurality of multiple diffraction regions each corresponding to the multiple diffraction region are arranged regularly in the quantization phase difference structure.

According to the optical structure, a direction of a spatial frequency component is determined in accordance with a direction toward which an inclined surface of a projecting structure in the multiple diffraction region faces.

According to the optical structure, a shortest distance R from the plurality of reproduction points reproduced from the spatial frequency component to a plane where the reproduction points are provided satisfies a relationship of $R > D^2/\lambda$, where D is a length of the entire multiple diffraction region and $\lambda$ is a wavelength of light in the multiple diffraction region.

According to the optical structure, an incident light vector perpendicular to the plane is $\vec{I}=(0,0,-1)$, and a normal vector relative to an inclined surface of a polygon in a phantom 3D shape constructed on the plane is $\vec{n}$, an angle between $-\vec{I}$ and the normal vector $\vec{n}$ is θ1, an angle between an alignment direction $\vec{a}$ of the plurality of reproduction points, and the normal vector $\vec{n}$ is θ2, and if θ1=θ2=θ, the plurality of reproduction points are distributed in accordance with the alignment direction $\vec{a}=\vec{I}+2\cos(\theta)\cdot\vec{n}$.

According to the optical structure, light intensity distribution of the plurality of reproduction points is determined such that, among the plurality of reproduction points, a reproduction point existing in a direction in which incident light is reflected on the inclined surface of the polygon in a specular manner has a highest light intensity, and a reproduction point shifted further from the direction in which the incident light is reflected in a specular manner has a lower light intensity.

According to the optical structure, the plurality of reproduction points are arranged at an irregular interval in a space.

According to the optical structure, the multiple diffraction region is a cell type.

According to the optical structure, a depth of the quantization phase difference structure is different for each of the multiple diffraction regions.

According to the optical structure, the optical structure further includes a reflection layer on a surface of the quantization phase difference structure.

According to a certain aspect, the optical structure is included in an authentication body.

According to the present optical structure, it is possible to realize an optical structure and an authentication body that includes the optical structure, wherein the optical structure can enable three-dimensional expression regardless of a light source, improve the visual quality of the iridescent color that belong to the conventional hologram, and obtain a sparkling and blinking effect similar to jewels in accordance with a visual angle, which is different from the conventional hologram, when displaying graphic information such as a picture or character information as forgery prevention means to improve security of, for example, securities and card media, or passports and visas.

In particular, in this description, the design is made so that light spreads centering around the specular direction on the premise for computation that the light is incident from the direction opposite from the normal direction of the carrier by 180°. Accordingly, even if the light is incident obliquely with respect to the normal direction of the carrier, the light is reflected in the direction approximately the same as a reflected direction of the light in a case where there is actually an inclined surface. Thus, the same shading of light as in a case where a phantom three-dimensional object actually exists there is observed, making it appear that a three-dimensional object exists there.

According to the present optical structure, the reflected direction of the light when the light is vertically incident on a flat surface can be specified by the quantization phase difference structure, and the light can be reflected in a plurality of directions by providing a plurality of spatial frequency components.

This effect realizes an effect equivalent to that when the light is reflected on an object, the regular reflection component is strongly reflected, and the more the angle is shifted from the specular direction, the less the reflected light intensity becomes. In addition, a bright spot of shading can be generated by making the spatial frequency components discrete, which generates a sparkling effect similar to jewels.

According to the present optical structure, it is also possible that a plurality of multiple-diffraction regions compose the quantization phase difference structure.

According to the present optical structure, it is also possible to determine the direction of the spatial frequency components in accordance with the direction toward which the inclined surface of spatial frequency multiplexing faces.

According to the present optical structure, it is also possible to obtain an effect that the light is reflected in the direction of a reproduction point without directly viewing the reproduction point by setting a diffraction region of the light that is diffracted from the multiple-diffraction region to a Fraunhofer region.

According to the present optical structure, it is also possible to substitute a reflected light effect of the light by pseudo computation of diffraction.

According to the present optical structure, it is also possible to realize an effect of light appearing to shine on a real surface by increasing the light intensity in the specular direction and reducing the intensity of light shifted from the regular reflection.

According to the present optical structure, it is also possible to reflect a reproduced image with a white color in a direction of dense reproduction points; on the other hand, in a part where the reproduction points are coarse, it is possible to reproduce an iridescent reproduced image such as a conventional hologram, and to control both of a white and iridescent colors.

According to the present optical structure, it is also possible to set the multiple-diffraction region to a cell type.

According to the present optical structure, it is also possible to control a reflection color of the light in accordance with the depth of the quantization phase difference structure when the light is reflected, which enables full-color expression of a three-dimensional image.

According to an optical structure including the present reflection layer, it is also possible to increase the reflectivity of the light.

According to the present authentication body, it is possible to create three-dimensional expression without depending on a light source, improve the visual quality of the rainbow color belonging to the conventional hologram, and realize a sparkling and blinking effect similar to jewels depending on a visual angle.

BRIEF DESCRIPTION OF THE DRAWINGS

FIG. 4A is a front view showing a sphere as an example of a pseudo three-dimensional shape.

FIG. 4B is a plan view of an optical structure for expressing the sphere in FIG. 4A in a pseudo manner.

FIG. 4C is a cross-sectional view showing a positional relationship between the optical structure in FIG. 4B and the sphere in FIG. 4A.

FIG. 6C is a graph showing an embodiment of a spatial frequency distribution.

FIG. 6D is a graph showing an embodiment of a spatial frequency distribution.

FIG. 11A is a plan view showing an embodiment of a multiple-diffraction region formed by an embossed layer.

FIG. 11B is a diagram showing an example of spatial frequency components in the multiple-diffraction region shown in FIG. 11A.

FIG. 12A is a plan view showing an example of an embodiment of a spatial frequency component different from FIG. 11B.

FIG. 12B is a plan view showing another example of the embodiment of spatial frequency components different from FIG. 11B.

FIG. 12C is a plan view showing yet another example of the embodiment of a spatial frequency component different from FIG. 11B.

FIG. 15 is a photograph of an image obtained by the optical structure according to one embodiment of the present invention.

DETAILED DESCRIPTION

An embodiment of the present invention will be described in detail with reference to the drawings. The constituent elements exhibiting identical or similar functions will be referred to by the same reference symbols throughout all drawings, and overlapping explanations will be omitted.

(Optical Structure and Authentication Body)

Figure 1A:
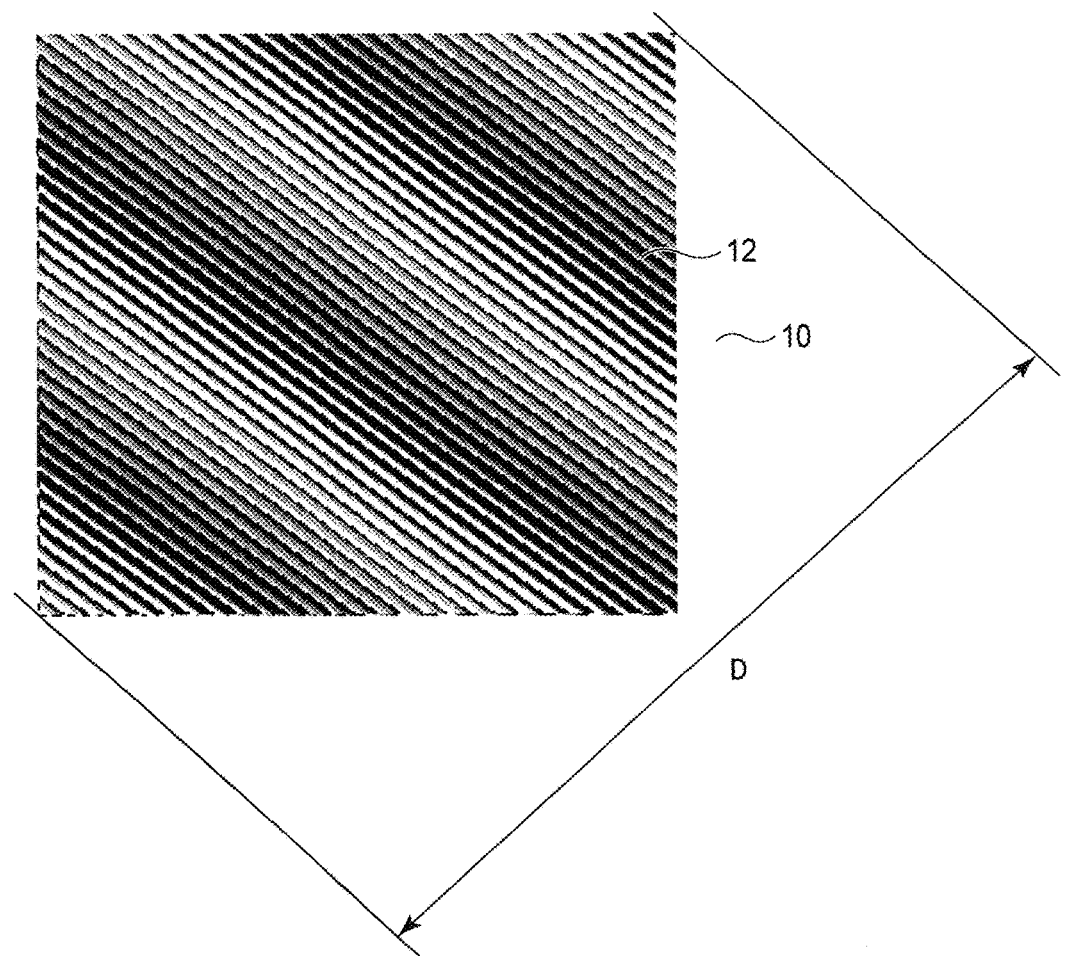
FIG. 1A is a plan view showing a multiple-diffraction region included in an optical structure according to one embodiment of the present invention.
Figure 1B:
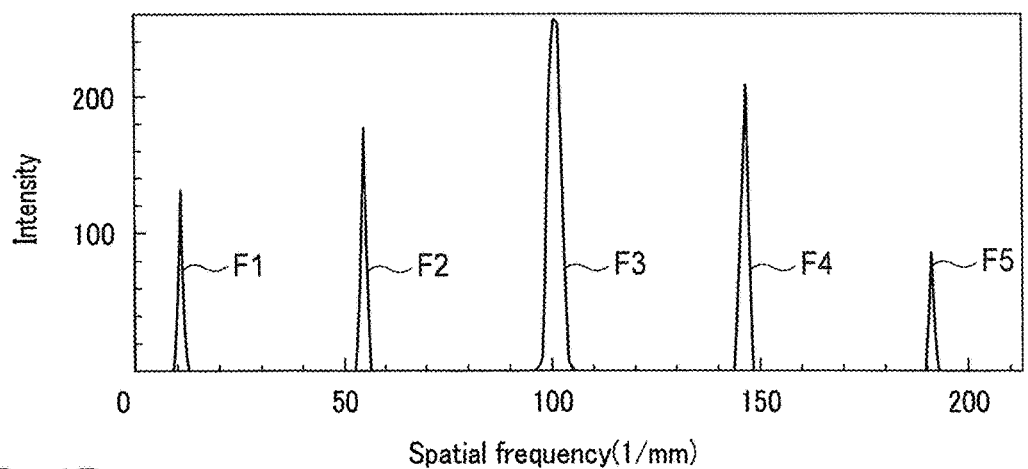
FIG. 1B is a graph showing a peak intensity of a spatial frequency component in the multiple-diffraction region shown in FIG. 1A.

FIG. 1A is a plan view showing an embodiment of a multiple diffraction region 12 in a quantization phase difference structure included in an optical structure 10 according to one embodiment of the present invention, and FIG. 1B is a graph showing an example of peak intensities of a spatial frequency components F1 to F5 at the five reproduction points in this multiple diffraction region 12. The optical structure 10 has an embossed surface on one side or both sides of the embossed layer. The embossed surface has a multiple-diffraction region on a part or the entire surface thereof. A quantization phase difference structure is formed on the multiple-diffraction region.

As in FIG. 1A, in the quantization phase difference structure, a plurality of quantization projecting portions with a constant size and a plurality of quantization recessed portions with a constant size are aligned. In FIG. 1A, the light parts represent the quantization projecting portions, and the dark parts represent the quantization recessed portions. The quantization projecting portions and quantization recessed portions are arranged at a regular interval. A quantization recessed portion or a quantization projecting portion is arranged adjacently to a quantization projecting portion at a regular interval. A quantization projecting portion or a quantization recessed portion is arranged adjacently to a quantization recessed portion at a regular interval. For example, in the quantization phase difference structure, the quantization projecting portions and the quantization recessed portions are alternately arranged one by one, or for every set of multiple quantization projecting portions and quantization recessed portions.

In the quantization phase difference structure of the multiple diffraction region 12, spatial frequency components with a coarse pitch and spatial frequency components with a fine pitch overlap with each other on an embossed surface in accordance with the arrangement of the quantization projecting portions and quantization recessed portions. The multiple diffraction region 12 may be a cell including the quantization phase difference structure. In the quantization phase difference structure of the multiple diffraction region 12, the ribbed projecting portions where the quantization projecting portions are aligned are arranged adjacent to and alternately with the groove-like recessed portions having an element structure where the quantization recessed portions as recessed portions of a constant size are aligned in parallel with the ribbed projecting portions, and a size of the quantization projecting portion may be from a 20th to a half of a central wavelength of a visible wavelength. A size of the quantization recessed portion may be from a 20th to a half of the central wavelength of the visible wavelength. Specifically, a size of the quantization projecting portion may be from 25 to 250 nm. A size of the quantization recessed portion may be from 25 to 250 nm. The quantization projecting portion may take a square shape. The quantization recessed portion may take a square shape. A corner of the quantization projecting portion may be round. A corner of the quantization recessed portion may be round. The quantization projecting portions and the quantization recessed portions may be aligned on a imaginary grid. The height of the quantization projecting portion may be the same as or an integral multiple of the reference height. The depth of the quantization recessed portion may be the same as or an integral multiple of the reference depth. The reference height and the reference depth may be the same. The value of the integral multiple may be from 1 to 4. It may also be from 1 to 8. The reference height and the reference depth may be from 10 to 500 nm.

In the case where the reproduced image of a hologram reproduced by the multiple diffraction region 12 is a group of five reproduction points, if a spatial frequency component is computed along one predetermined direction D within the plane of the multiple diffraction region 12 as shown in FIG. 1A, there are five discrete peaks at the spatial frequency components F1 to F5 corresponding to the reproduction points as shown in FIG. 1B. The horizontal axis in FIG. 1B is a spatial frequency (1/mm), and the vertical axis is a strength of the spatial frequency component.

The reproduced image is in an iridescent color if the discrete spatial frequency components are coarse, and the reproduced image is in a white color if the discrete spatial frequency components are dense. It is possible to show a reproduced image in an iridescent color at a certain angle direction and in a white color at other angle directions by adjusting denseness and coarseness of the distribution of the spatial frequency components.

Figure 2:
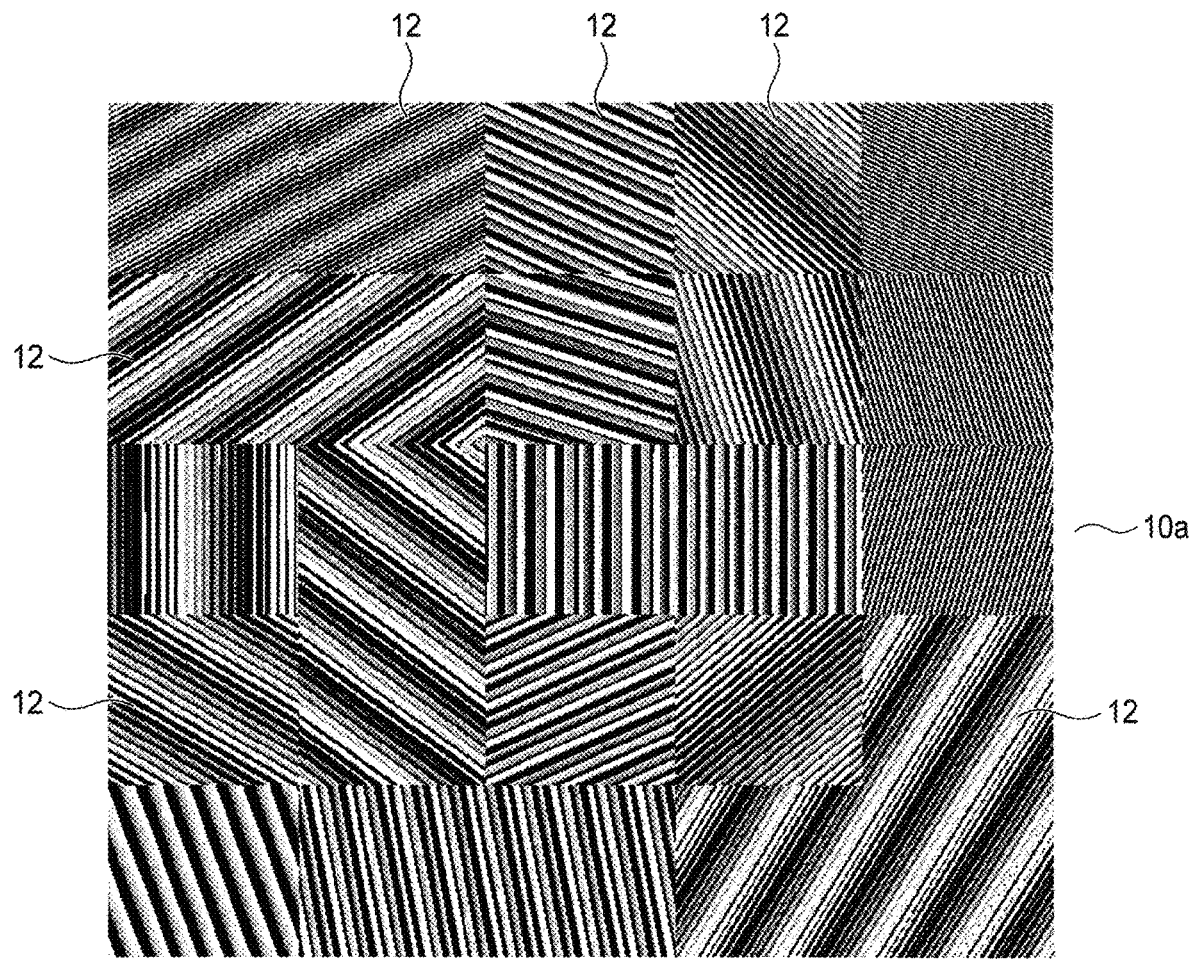
FIG. 2 is a plan view showing an example of an optical structure provided with a plurality of multiple-diffraction regions.

FIG. 2 is a plan view showing an example of an optical structure 10a provided with a plurality of multiple diffraction regions 12.

In this manner, the number of the multiple diffraction region(s) 12 included in the optical structure 10 is not limited to one as in FIG. 1A, but may be plural as in FIG. 2. The planar shape of each multiple diffraction region 12 shown in FIG. 1A and FIG. 2 is a rectangular shape, but shapes other than a rectangular shape may be used.

Figure 3:
FIG. 3 is a cross-sectional view showing a quantization phase difference structure.

FIG. 3 is a cross-sectional view showing a quantization phase difference structure 14.

A reflection layer (not shown) may be provided on the surface of the quantization phase difference structure 14 of which a cross-sectional view is shown in FIG. 3. The reflection layer may be translucent or opacifying.

The reflection layer may be a reflection layer made of a metal material. The metal material may be Al, Ag, Sn, Cr, Ni, Cu, Au, or an alloy thereof, for example. A reflection layer made of metal may be an opacifying reflection layer. Alternatively, a reflection layer may be a dielectric layer of which a refractive index is different from a relief structure forming layer. Alternatively, a reflection layer may be a stacked body of dielectric layers in which adjacent layers have different refractive indices, namely, a dielectric multi-layer film. It is desirable that a dielectric layer, among the dielectric layers included in the dielectric multi-layer film, in contact with the relief structure forming layer has a different refractive index from the refractive index of the relief structure forming layer. The dielectric layer may be a metal compound or silicon oxide. The metal compound may be metal oxide, metal sulfide, or metal fluoride, for example. The dielectric layer may be made of $TiO_2$, ZnO, $Si_2O_3$, SiO, $Fe_2O_3$, ZnS, CaF, or MgF. The reflection layer can be formed by a vapor-phase deposition method. A vacuum evaporation method and a sputtering method can be applied as the vapor-phase deposition method. The reflection layer of the dielectric layer may be translucent. The reflection layer may be from 10 to 100 nm.

The reflection layer can be formed by using an ink. This ink may be an offset ink, a letterpress ink, and a gravure ink in accordance with a printing method. A resin ink, an oil-base ink, and a water-base ink may be used in accordance with the composition difference. An oxidation polymerization ink, a penetration drying ink, an evaporation drying ink, and an ultraviolet curing ink can be used in accordance with differences among drying methods.

A reflection layer may be a functional ink in which color changes in accordance with the illumination angle or the observation angle. Such a functional ink may be an optical variable ink, a color-shifting ink, and a pearl ink.

In order to perform hologram computation for a pseudo polygon intended to be expressed by using a quantization phase difference structure 14, an inclination angle of the polygon is determined, and the quantization phase difference structure 14 corresponding to an inclined surface 15 of the inclination angle (see FIG. 5 described later) is computed.

FIG. 4A is a front view showing a sphere 16 as an embodiment of a pseudo polygon that emerges because of the diffraction light of the quantization phase difference structure 14. FIG. 4B is a plan view of an optical structure 10b where a plurality of multiple diffraction regions 12 having a plurality of spatial frequency components of different directions are arranged for expressing the sphere 16 as in FIG. 4A in a pseudo manner. FIG. 4C is a cross-sectional view showing a positional relationship between the optical structure 10 and the sphere 16.

Figure 5:
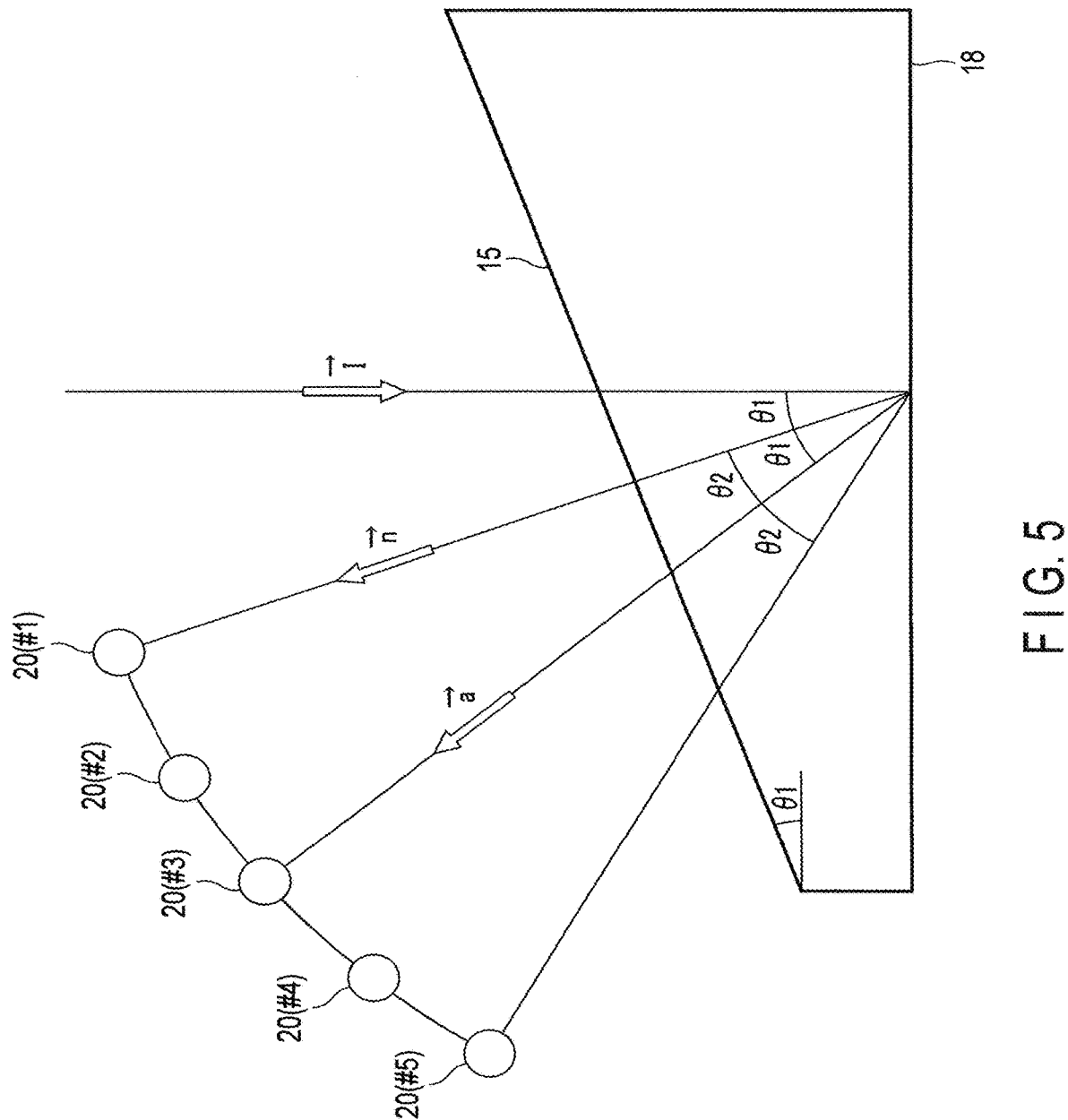
FIG. 5 is a cross-sectional view showing a part of a polygon in a pseudo 3D shape for a sphere.

FIG. 5 is a cross-sectional view showing a part of a polygon in a pseudo 3D shape for a sphere 16. It is formed of the inclined surface 15 having an inclination angle θ1 relative to the reference plane 18 of the multiple diffraction region 12.

FIG. 5 also shows the positional relationship between the inclined surface 15 and the reproduction point 20. As shown in FIG. 5, the reproduction point 20 is arranged in the specular direction of the inclined surface 15 in the embodiment of the present invention, thereby providing a visual effect in which the phantom inclined surface 15 appears to exist when the light is incident.

In a case of computing the inclined surface 15 on which the light is vertically incident, the incident light vector perpendicular to the reference plane 18 is $\vec{I}=(0,0,-1)$. A normal vector relative to the inclined surface 15 of the polygon in a phantom 3D shape constructed on the reference plane 18 is $\vec{n}$.

The angle between $-\vec{I}$ and the normal vector $\vec{n}$ is θ1, and the angle between the alignment direction $\vec{a}$ of plurality of reproduction points 20 (#1) to (#5) and a normal vector $\vec{n}$ is θ2. If θ1=θ2=θ, the plurality of reproduction points 20 (#1) to (#5) are distributed in accordance with the alignment direction $\vec{a}=\vec{I}+2\cos(\theta)\cdot\vec{n}$.

The shortest distance R from the reproduction points 20 (#1) to (#5) to the reference plane 18 satisfies the relationship as expressed $R>D^2/\lambda$ in which D is the length of the entire multiple diffraction region 12, and λ is the wavelength of the light in the multiple diffraction region 12.

The light intensity distribution of a plurality of reproduction points 20 (#1) to (#5) is determined in a manner that, among the reproduction points 20 (#1) to (#5), the reproduction point 20 (#3) existing in a direction in which the incident light is reflected on the inclined surface 15 of the polygon in a specular manner has the highest light intensity, and a reproduction point shifted further from the specular direction has a lower light intensity; in other words, the light intensity reduces in the order of the reproduction point 20 (#3), reproduction point 20 (#2), and reproduction point 20 (#1), and in the order of the reproduction point 20 (#3), reproduction point 20 (#4), and reproduction point 20 (#5).

This enables realization of the reflection intensity distribution of the inclined surface 15 by computation.

The above light intensity distribution and another light intensity distribution can be applied. FIG. 5 shows an embodiment in which the plurality of reproduction points 20 (#1) to (#5) are arranged at a regular interval in a space; however, the plurality of reproduction points 20 (#1) to (#5) may be arranged at an irregular interval. The above matters will be explained with reference to FIGS. 6A to 6D. In FIGS. 6A to 6D, the horizontal axis represents the aligned direction of the reproduction points 20, and the vertical axis represents the intensity of the reproduction points 20. $\vec{a}$ of the horizontal axis corresponds to the specular direction.

Figure 6A:
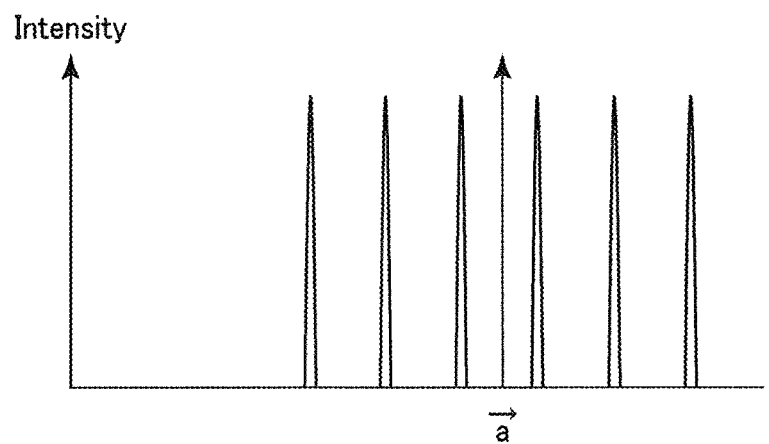
FIG. 6A is a graph showing an embodiment of a spatial frequency distribution.
Figure 6B:
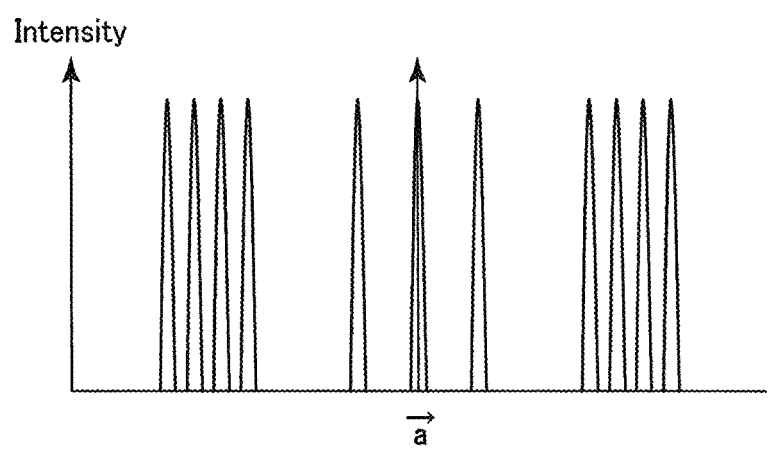
FIG. 6B is a graph showing an embodiment of a spatial frequency distribution.

FIG. 6A shows an embodiment in which the reproduction points 20 with the same intensity are not arranged in the specular direction, but six reproduction points 20 are arranged at a regular interval with the specular direction at the center. FIG. 6B shows an embodiment in which 11 reproduction points 20 with the same intensity are arranged coarsely in the vicinity of the specular direction, and densely at a position away from the specular direction. FIG. 6C shows an embodiment in which the reproduction points 20 are not arranged in the specular direction, but reproduction points 20 are arranged at a regular interval in a manner that the intensity is high in the vicinity of the specular direction, and the intensity is lower in a position further away from the specular direction. FIG. 6D shows an embodiment in which the reproduction points 20 are not arranged in the vicinity of the specular direction, but reproduction points 20 are arranged at a regular interval in a manner that the intensity is higher in a position further away from the specular direction, and lower in a position closer to the specular direction. In the present embodiment, the intensity distribution of the reproduction points 20 can be set discretionarily.

As described above, in the embodiment of the present invention, the reproduction points 20 are arranged in a discrete manner with the specular direction at the center as shown in FIG. 5, thereby providing a reproduced image with luster in which each polygon intricately changes in accordance with the viewpoint and the light source like jewels. The luster that intricately changes has a sparkling appearance.

Figure 7:
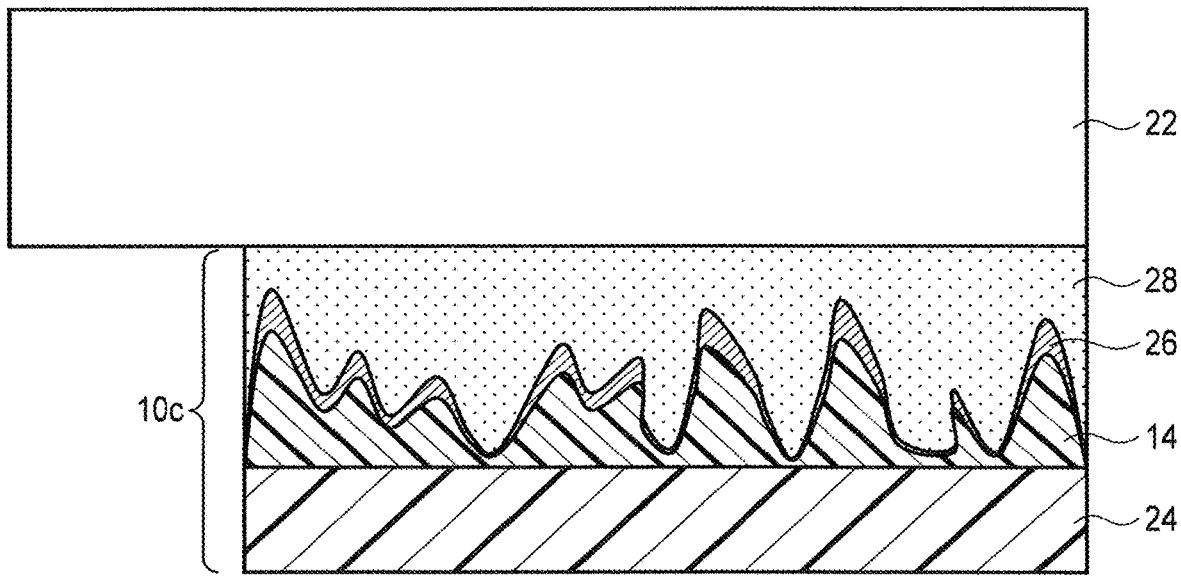
FIG. 7 is a cross-sectional view showing a state where an optical structure adheres to a medium.

FIG. 7 is a cross-sectional view showing an embodiment in which an optical structure 10c adheres to an adherend 22 so as to be applied to the authentication body.

To adhere to the adherend 22, the optical structure 10c has the quantization phase difference structure 14 on a carrier 24, a reflection layer 26 made of a metal thin film is formed on the surface of the quantization phase difference structure 14, an adhesion layer 28 is provided on the surface of the reflection layer 26, and the optical structure 10c adheres to the adherend 22 via the adhesion layer 28.

The carrier 24 is transparent so as to reduce the loss of the reflected light. The carrier 24 can be made of a rigid body such as glass, or a film. The film may be a plastic film. The plastic film may be a PET (polyethylene terephthalate) film, PEN (polyethylene naphthalate) film, or a PP (polypropylene) film, for example. Depending on the use and purpose, a paper, a synthetic paper, a plastic multi-layer paper, a resin impregnated paper, etc. c be used as a carrier.

The material forming the quantization phase difference structure 14 can be thermoplastic resin such as urethane resin, polycarbonate resin, polystyrene resin, polyvinyl chloride resin, etc., thermoset resin such as unsaturated polyester resin, melamine resin, epoxy resin, urethane (meta-)acrylate, polyester (meta-)acrylate, epoxy (meta-)acrylate, polyol (meta-)acrylate, melamine (meta-)acrylate, triazine (meta-)acrylate, etc., a composite thereof, or a thermoformable material having a radical polymerizable unsaturated group, for example.

Figure 8:
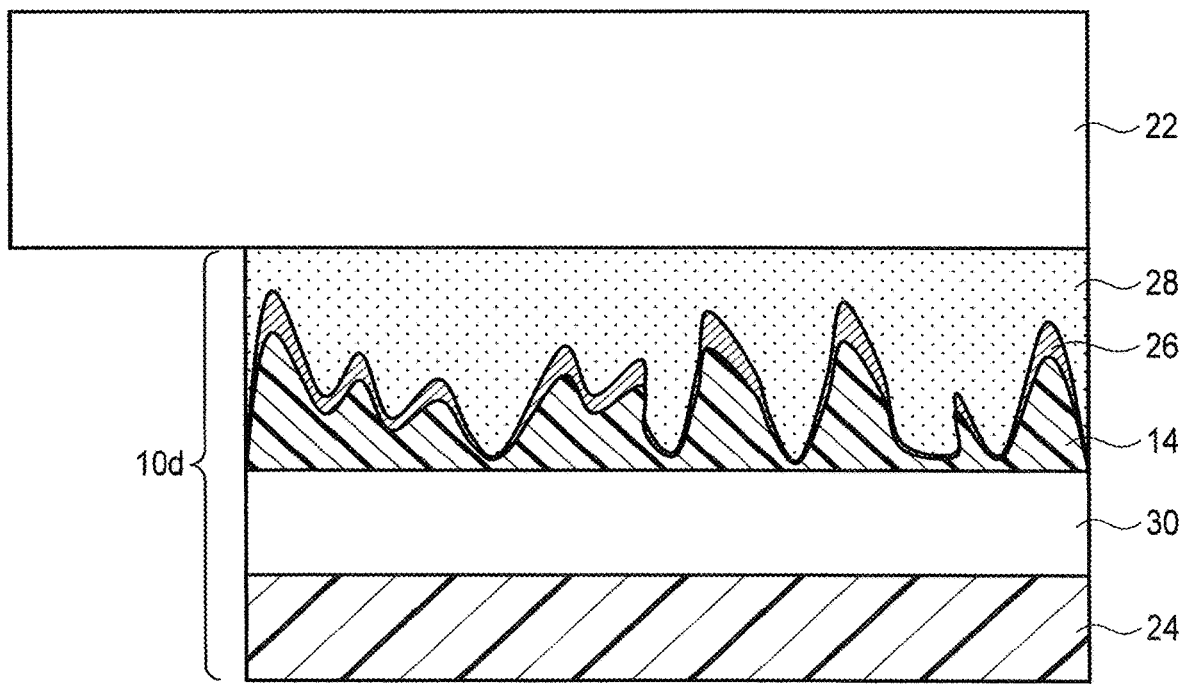
FIG. 8 is a cross-sectional view showing a state where an optical structure adheres to a medium.

FIG. 8 is a cross-sectional view showing another embodiment in which an optical structure 10d adheres to an adherend 22 so as to be applied to the authentication body.

The optical structure 10d shown in FIG. 8 is different from the optical structure 10c shown in FIG. 7 in that a peeling layer 30 is provided between the carrier 24 and the quantization phase difference structure 14 for peeling off the carrier 24.

After the optical structure 10d adheres to the adherend 22 via the adhesion layer 28, the carrier 24 is peeled off by peeling of the peeling layer 30; thus, the carrier 24 needs not be transparent.

The forming material of the peeling layer 30 may be resin. In addition, the peeling layer 30 may include a lubricant. The resin may include thermoplastic resin, thermoset resin, ultraviolet curable resin, and electron beam curable resin, for example. The resin may be acrylate resin, polyester resin, or polyamide resin.

The lubricant may be wax such as polyethylene powder, paraffin wax, silicone, and carnauba wax. These may be applied, as the peeling layer 30, on the layer of the carrier 24. Publicly known application methods may be applied to the application. The application may be a gravure coat, a micro gravure coat, a die coat, or a lip coat, for example. The thickness of the peeling layer 30 may be within the range from 0.5 to 5 μm.

In the optical structure 10 according to the above embodiments of the present invention, graphic information such as a picture or character information can be the rainbow-free colors, and the appearance can have luster like jewels depending on the viewpoint and the light source. This appearance is sparkling since blinking brightness is given by blinking in viewpoint and light source. This appearance can improve security of, for example, quantization phase difference structure securities and card media, or passports and visas.

EMBODIMENT

Comparative Example

In the embodiments of the present invention, as shown in FIGS. 6A to 6D, a plurality of spatial frequency components are taken into consideration, and a plurality of reproduction points 20 are taken into consideration in accordance therewith. In the present comparative example, the number of reproduction points is set to N=1 for comparison in computation of the hologram.

In the optical structure 10, 250 by 250 multiple diffraction regions 12 constituted by quantization projecting portions and quantization recessed portions aligned on a grid of 240×240 are arranged. Each of a quantization projecting portion and a quantization recessed portion is a square having a side of 100 nm. This graphic resolution is the graphic resolution of drawing on a resist of an electron beam drawing device.

After drawing on a resist, Ni sputtering is performed, and a Ni plate is produced after Ni electrocasting. From this Ni plate, emboss molding is performed to a PET film by a UV curable resin. 150 nm of Al is evaporated on the surface of the structure after emboss molding.

As a result, a reproduced image which shines dimly in a rainbow color is reproduced. The reproduced image is reproduced in a rainbow color because the computation is performed using the number of reproduction points N=1, and there are few scattering components. Similarly, the reproduced image is dim because there are few scattering components and reflected light cannot be visually confirmed.

Example 1

To be compared with the above comparative example, in the present example 1, hologram computation is performed under the condition that the number of reproduction points is set to N=5, the light intensity of the reproduction points is set to cos $(\delta)\char`\^s$, and s=20.

θ at this time is equal to the inclination angle of the inclined surface 15. In FIG. 5, the direction of $\vec{a}$ is θ=0. θ2 in FIG. 5 is set to 90 degrees.

In addition, the optical structure 10 is produced in the same manner as the comparative example. To sum up, 250 by 250 multiple diffraction regions 12 constituted by quantization projecting portions and quantization recessed portions aligned on a grid of 240×240 are arranged; each of a quantization projecting portion and a quantization recessed portion is set to a square having a side of 100 nm; Ni sputtering is performed after drawing on a resist, a Ni plate is produced after Ni electrocasting; emboss molding is performed with this Ni plate to a PET film by UV curable resin; and 150 nm of Al is evaporated on the surface of the structure after emboss molding.

As a result, a reproduced image shining in an iridescent color is reproduced. Its brightness is greater than the comparative example. The reproduced image is reproduced in the iridescent color because the computation is performed using the number of reproduction points N=5, and the number of the reproduction points is not enough for reproduction in a white color although the reproduced image is reproduced more brightly than the comparative example since there are more reproduction points than the comparative example.

Example 2

For comparison with the above comparative example and Example 1, the computation of the phase is performed in the present Example 2, while the number of reproduction points N is set to 91 and other conditions are not changed.

The optical structure 10 is produced similarly to the comparative example. To sum up, 250 by 250 multiple diffraction regions 12 constituted by quantization projecting portions and quantization recessed portions aligned on a grid of 240×240 are arranged, and each of a quantization projecting portion and a quantization recessed portion is set to a square having a side of 100 nm, Ni sputtering is performed after drawing on a resist and Ni plate is produced after Ni electrocasting, emboss molding is performed with this Ni plate to a PET film by UV curable resin, and 150 nm of Al is evaporated on the surface of the structure after emboss molding.

As a result, a reproduced image is reproduced in a white color. This is because the large number of the reproduction points, N=91, allows the iridescent color to mix sufficiently, which enables reproduction in a white color. Its brightness is greater than the comparative example and Example 1. This is because the number of the reproduction points N has increased to increase scattering components.

In this manner, it is confirmed that the present optical structure can realize a brighter and whiter reproduced image by increasing the number of the reproduction points, as in the comparison between the comparative example and Examples 1 and 2.

(Optical Structure)

An optical structure according to another embodiment of the present invention will be described.

In the optical structure according to another embodiment of the present invention, a peeling layer, an embossed layer, and a reflection layer are laminated on a film.

Figure 9A:
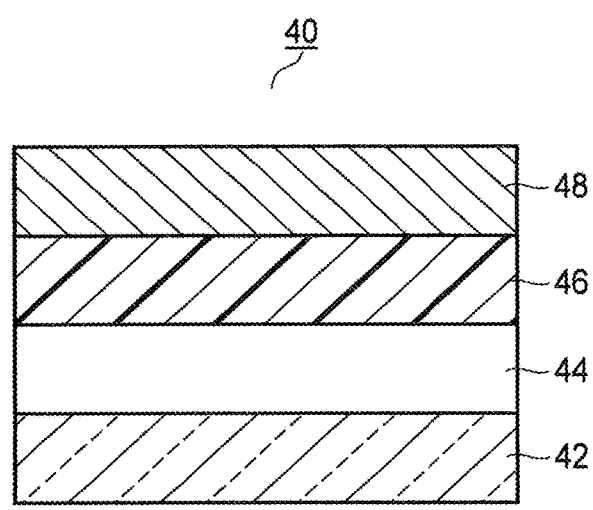
FIG. 9A is a cross-sectional view schematically showing a configuration example of an optical structure as a material for an optical structure according to another embodiment of the present invention.
Figure 9B:
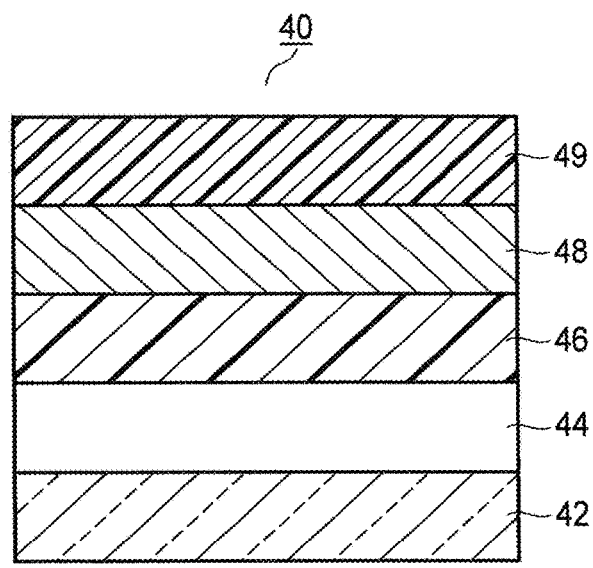
FIG. 9B is a cross-sectional view schematically showing another configuration example of an optical structure as a material for an optical structure according to another embodiment of the present invention.

FIGS. 9A and 9B are a cross-sectional view schematically showing a configuration of an optical structure according to another embodiment of the present invention.

As shown in FIG. 9A, an optical structure 40 is constituted by laminating a peeling layer 44, an embossed layer 46, and a reflection layer 48 on a film 42.

As shown in FIG. 9B, further in the optical structure 40, a protection layer 49 for protecting the reflection layer 48 may be layered on the non-embossed layer side of the reflection layer 48.

The carrier 42 can be a rigid body such as glass, or a film. The film may be plastic. The plastic film may be a PET (polyethylene terephthalate) film, PEN (polyethylene naphthalate) film, or a PP (polypropylene) film, for example. Depending on the use and purpose, a paper, a synthetic paper, a plastic multi-layer paper, a resin impregnated paper, etc. may be used. The carrier may be a heat-resistant material. The heat-resistant material has small deformations and deteriorations due to heat and pressure, etc. applied when the embossed layer 46 is laminated.

The forming material of the peeling layer 44 can be resin. In addition, the peeling layer 44 may include a lubricant. The resin may be acrylate resin, polyester resin, or polyamide resin. The resin may be thermoplastic resin, thermoset resin, ultraviolet curable resin, and electron beam curable resin, for example. The lubricant may be wax such as polyethylene powder, paraffin wax, silicone, and carnauba wax. The peeling layer 44 may be formed by a publicly known application method. The peeling layer 44 may be formed on the carrier 42 by a gravure printing method or a micro gravure method, for example. The thickness of the peeling layer 44 may be within the range from 0.5 to 5 μm.

Next, the embossed layer 46 will be described.

Figure 10:
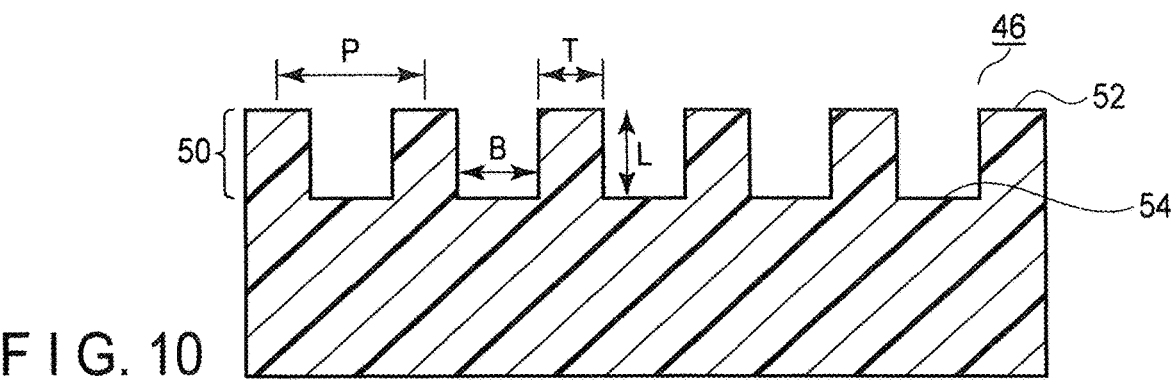
FIG. 10 is a cross-sectional view schematically showing a configuration example of an embossed layer included in the optical structure.

FIG. 10 is a cross-sectional view schematically showing a structure of the embossed layer 46 of the optical structure 40.

The embossed layer 46 is in an approximately flat shape, and has a quantization phase difference structure 50 on one side. A length L from the upper surface 52 of the quantization projecting portion of the quantization phase difference structure 50 to the lower surface 54 of the quantization recessed portion is constant regardless of a position on the surface of the embossed layer 46. The upper surface 52 of the quantization projecting portion and the lower surface 54 of the quantization recessed portion can be approximately parallel to the carrier 42. Such embossed layer 46 modifies a color of the reflected light based on the length L. The concavoconvex direction of the quantization phase difference structure 50 (namely, the vertical direction in FIG. 10) is perpendicular to the extending direction of the ribbed recessed portion and the groove-like recessed portion formed by the top surface 52 of the quantization projecting portion and the bottom surface 54 of the quantization recessed portion. This structure enables broadening the emission distribution of light, and enables control without damaging the color tone of the light.

The embossed layer 46 has an embossed surface on one side or both sides. The embossed surface includes a phase angle recording region. A quantization phase difference structure is formed in the phase angle recording region. In a quantization phase difference structure, quantization projecting portions and quantization recessed portions are aligned. A quantization projecting portion and a quantization recessed portion has a horizontal width of the integral multiple of a unit length, and a vertical width of the integral multiple of a unit length. The unit length may be from a 20th to a half of the center wavelength of the visible wavelength. The unit length may be from 25 to 250 nm.

The quantization projecting portions are arranged at the portion where a phase angle to be recorded is equal to or more than 0 and less than $\pi$. If the height of the quantization projecting portions is constant, the phase angle equal to or more than 0 and less than $\pi$ is quantized to $\pi/2$. The quantization projecting portions have a quantized height corresponding to $\pi/2$. If the quantization projecting portions have a plurality of heights, the heights are quantized at an interval of $\pi/(2 \cdot n)$. The quantization projecting portions have respective quantized heights corresponding to respective phases. The quantization recessed portions are arranged at the portion where a phase angle to be recorded is equal to or more than $\pi$ and less than $2\pi$. If the depth of the quantization recessed portions is constant, the phase angle equal to or more than $\pi$ and less than $2\pi$ is quantized to $3\pi/2$. If there are a plurality of depths of the quantization recessed portions, the quantization is performed at an interval of $\pi/(2 \cdot n)$. The quantization recessed portions have respective quantized heights corresponding to respective phases. A wavelength of the light, which is diffracted in a specific angle because of a mutual effect of the quantization projecting portions and the quantization phase difference structure where the quantization recessed portions are aligned, is determined in accordance the spatial frequency, the incident angle, and the diffraction angle determined in accordance with the arrangement of the quantization projecting portions and the quantization recessed portions. Accordingly, in the multiple diffraction region of the embossed surface, space frequencies of the quantization projecting portions and the quantization recessed portions are discrete; thus, only diffraction light corresponding to the spatial frequency is diffracted. Since the diffraction light is emitted with wavelengths at a certain interval, the observed diffraction light is in a mixed color of diffraction lights with a plurality of specific wavelengths.

If the quantization recessed portions have a constant depth and the quantization projecting portions have a constant height, the reflected light on the top surfaces of the quantization projecting portions interferes with the reflected light on the bottom surface of the quantization recessed portions due to the mutual effect with the quantization phase difference structure in which the quantization recessed portions are aligned. If the quantization recessed portions have a constant depth and the quantization projecting portions have a constant height, the depth and the height may be from 100 nm to 400 μm.

The interfering light becomes maximum when the phase difference between the reflected light of the top surface and the reflected light of the bottom surface with a uniform phase is 0 or an integral multiple of $2\pi$, and the reflected light becomes 0 when the reflected light on the top surface and the reflected light on the bottom surface with opposite phases have the phase difference of an integer multiple of n and interfere with and annihilate each other. The reflected light seamlessly varies from the maximum to 0 between the phase difference when the phases are uniform and the phase difference when the phases are opposite. Since the phase difference is proportional to the wavelength of the reflected light, the intensity of the reflected light with each wavelength caused by the interference sequentially varies. Accordingly, the reflected light caused by the interference is in a specific band.

A quantization phase difference structure, in which the quantization recessed portions have a constant depth and the quantization projecting portions also have a constant height, emits reflected light by these interference and diffraction.

Accordingly, a quantization phase difference structure, in which the quantization recessed portions have a constant depth and the quantization projecting portions also have a constant height, selectively emits reflected light in a band of the interfering light among the diffraction light. With normal diffraction, diffraction light of a high level equal to or higher than a secondary level, which is normally determined as noise, is also emitted; thus, reflected light as designed cannot be obtained. However, since the interfering light among the diffraction light is selectively reflected in the quantization phase difference structure of the present invention, reflected light that does not include a high-level diffraction light can be obtained.

For modifying the band of interference by the quantization phase difference structure, the top surface of the quantization projecting portion or the bottom surface of the quantization recessed portion may be a rough surface. Thereby, a necessary band of interference by the quantization phase difference structure can be ensured.

The following operation is necessary for forming a quantization phase difference structure. First, as shown in FIG. 7 of Patent Literature 4 (WO 2017/209113), the computing device computes a phase $W(x,y)$ of the light from a reproduction point 22 (#a) with respect to quantization projecting portions and quantization recessed portions included in an overlapping region 19 (#1) where a computational element section 16 (#A) specified by one reproduction point 22 (#a) overlaps a phase angle recording region 18 (#a), and also in an overlapping region 19 (#2-1) where a computational element section 16 (#A) overlaps a part of a phase angle recording region 18 (#2).

There is one reproduction point 22, or a plurality of reproduction points 22. There is one computational element section 16 corresponding to one reproduction point 22. If there are a plurality of reproduction points 22, respective computational element sections 16 correspond to respective reproduction points 22 on a one-to-one basis, and there are the same number of computational element sections 16 as the number of the reproduction points 22.

If there are a plurality of reproduction points 22, the computing device further computes a phase $W(x,y)$ of the light from a reproduction point 22 (#b) with respect to quantization projecting portions and quantization recessed portions included in an overlapping region 19 (#2) where a computational element section 16 (#B) determined another reproduction point 22 (#b) overlaps a phase angle recording region 18 (#2), as shown in FIG. 7 of Patent Literature 4.

As shown in FIG. 7 of Patent Literature 4, if two computational element sections 16 (#A) and 16 (#B) overlap each other, the sum of phases $W(x,y)$ is computed.

The computing device further computes the phase angle $\varphi(x,y)$ based on the computed phases $W(x,y)$, and records information of numeral values of the computed phase angle $\varphi(x,y)$ in the corresponding overlapping region 19 as retardation. A phase angle $\varphi(x,y)$ is computed from the phase based on the formula $\phi(x,y)=\arg(W(x,y))$.

Herein, $W_n(kx,ky)$ is a phase of a reproduction point n at the coordinates $(kx,ky)$ in the computational element section 16 of the nth reproduction point, $W(x,y)$ is a phase at the coordinates $(x,y,0)$ to be recorded in the phase modulation structure, n is nth reproduction point (n=0 to Nmax), $amp_n$ is the amplitude of the light of nth reproduction point, i is an imaginary number, $\lambda$ is the wavelength of the light when reproducing a reproduced image to be reproduced with a group of reproduction points 22, $O_n(x)$ is a value of an x-coordinate of a reproduction point, $O_n(y)$ is a value of an y-coordinate of a reproduction point, $O_n(z)$ is a value of an z-coordinate of a reproduction point, $(kx,Ky,0)$ are coordinates of a quantization projecting portion and a quantization recessed portion, and $\varphi_n(kx,ky)$ is a phase angle of an nth reproduction point. Phase $W_n(kx,ky)$ is obtained at all points in the computational element section 16. Since a phase of a reproduction point n is the same at the points having the same distance from the reproduction point 22, information of a computed phase can be copied for the phase of a reproduction point n. Furthermore, as will be described below, $O_n(z)$ is a value of a z-coordinate of a reproduction point; in other words, since the phase $W_n(kx,ky)$ of the reproduction points having the same distance from the recording surface has the same phase distribution, information of a computed phase can be copied for the phase $W_n(kx,ky)$. Regarding the coordinates $(kx,ky)$ in the computational element section 16, if its central coordinate is set to $(0, 0)$, the x-coordinate of the corresponding reproduction point $O_n$ is $O_n(x)$ and the y-coordinate is $O_n(y)$; thus, the coordinates $(kx,ky)$ are related to the coordinates on the recording surface, $(x,y)$, as follows: $x=Kx+O_n(x)$, and $y=Ky+O_n(y)$.

If the phase of the reproduction point 22 for recording the numeral value information in the quantization projecting portions and quantization recessed portions increases, the amount of information also increases along with the increase, and the computation time also increases. If the phase of the reproduction point 22 for recording is too large, it may decrease the contrast of the reproduced image reproduced at the reproduction point 22. Thus, for example, as in the overlapping region 19 (#2-1), in order to obtain a clearer reproduced image for the part where the phase angle recording regions 18 of a plurality of reproduction points 22 (#a, #b) overlap with each other, it is preferable that overlapping of the computational element sections 16 is small, or in other words, the number of computational element sections existing in the phase angle recording regions 18 is small.

A phase angle recording region 18 may prevent overlapping of computational element sections 16, or in other words, may have one computational element section 16. Furthermore, if the phase angle recording region 18 has a plurality of computational element sections 16, the number of the computational element sections 16 in the phase angle recording region 18 may be set to equal to or less than 256. In this case, the computation is more efficiently performed. The number of the computational element sections 16 in the phase angle recording region 18 may be set to be equal to or less than 16. In this case, it is easier to obtain a clear reproduced image.

Phase $W(x,y)$ is computed with respect to the quantization projecting portions and quantization recessed portions in the overlapping region 19 where the computational element section 16 specified by the viewing angle θ overlaps the phase angle recording region 18, and a phase angle $\varphi(x,y)$ is computed based on the Phase $W(x,y)$. As described above, the upper limit of the viewing angle θ is specified, and a region where the phase angle $\varphi$ is computed is limited to the overlapping region 19; thus, the computation time is shortened. The computed phase angle $\varphi$ is recorded as retardation in a corresponding quantization projecting portion and a quantization recessed portion in the overlapping region 19. FIG. 9 of Patent Literature 4 is an SEM image showing quantization projecting portions and quantization recessed portions in which phase angles $\varphi$ are recorded. The quantization projecting portions and quantization recessed portions shown in FIG. 9 of Patent Literature 4 are squares of which side length is d, and are two-dimensionally arranged at an arrangement interval d in both the X direction and Y direction.

As shown in FIG. 7 of Patent Literature 4, other than the phase angle recording region 18, a phase angle non-recording region 20 may be provided on the recording surface 14. Even if the phase angle non-recording region 20 overlaps the computational element section 16, the computing device does not perform computation, and the phase angle is not recorded in the phase angle non-recording region 20. Instead, the phase angle non-recording region 20 may record information other than the phase angle, such as information related to scatter, reflection, and diffraction characteristics of the light. Alternatively, the phase angle non-recording region 20 may be translucent, and a printing may be carried out for the phase angle non-recording region 20. This improves the designability of the phase modulation structure having a recording surface.

For simplification, FIG. 10 shows the configuration where projections and recesses of the plurality of quantization phase difference structures 50 have the same pitch P; however, the configuration of the embossed layer 46 is not limited thereto. The embossed layer 46 may have different pitches P, different lengths L, different lengths T of the top surfaces 52 of the quantization projecting portions, and different lengths B of the bottom surfaces 54 of the quantization recessed portions. As will be described later, the embossed layer 46 has quantization phase difference structures 50 with locally different pitches P, lengths L, lengths T, and lengths B, so as to have a plurality of spatial frequency components in the quantization phase difference structures 50. Since these quantization phase difference structures 50 are constituted by quantization projecting portions and quantization recessed portions of a constant size, a structure smaller than the size of the quantization projecting portions and quantization recessed portions is not formed. On the other hand, a structure of the integral multiple of a quantization projecting portion or a quantization recessed portion is formed in a region where quantization projecting portions are continuously arranged or a region where quantization recessed portions are continuously arranged.

Figure 11C:
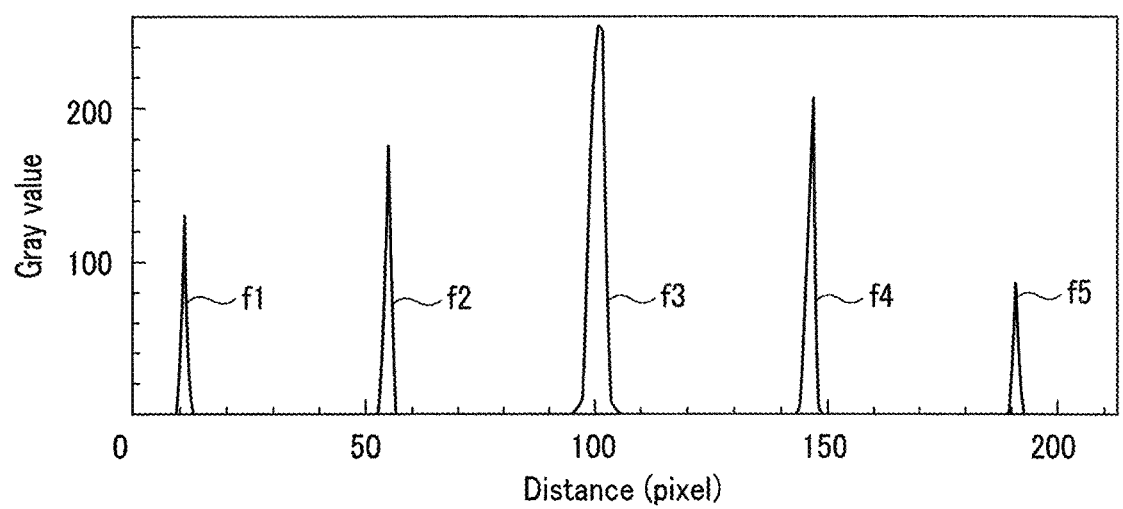
FIG. 11C is a graph showing a peak intensity in the multiple-diffraction region shown in FIG. 11A.

FIG. 11A is a plan view showing a multiple diffraction region formed by an embossed layer 46 having a quantization phase difference structure 50. FIG. 11A shows that a quantization phase difference structure 50 having many different pitches P is arranged over the entire surface of the embossed layer 46, similarly to FIG. 1A. FIG. 11B is a plan view of five spatial frequency components f1 to f5 in the multiple diffraction region of FIG. 11A. FIG. 11C is a figure showing peak intensities of spatial frequency components f1 to f5 shown in FIG. 11B. In FIG. 11C, the horizontal axis represents a distance (pixels) on the plane, and the vertical axis represents gray values. In this manner, also in the optical structure 40, multiple-diffraction regions, which respectively have specified spatial frequency components f1 to f5 respectively corresponding to respective reproduction points arranged in a discrete manner along one predetermined direction on a plane, are arranged in the quantization phase difference structure 50 on a plane, similarly to one embodiment of the present invention.

As shown in FIG. 11B, a plurality of spatial frequency components f1 to f5 are arranged separately in one direction. In FIG. 11B, five spatial frequency components f1 to f5 are shown as an example. However, in the embodiment of the present invention, the number of the spatial frequency components is from 5 to 200.

FIGS. 12A, 12B, and 12C are plan views showing spatial frequency components different from FIG. 11B for comparison.

Five spatial frequency components f1 to f5 shown in FIG. 11B to be compared are distributed separately in one direction, thereby restricting the range of color shift of the color of the reflected light. It is also possible to suppress decrease in brightness when viewed by eye or sensed with a measuring instrument, and suppress decrease in brightness of the reflected light, by changing the distance between adjacent spatial frequency components.

On the other hand, one spatial frequency component f6 shown in FIG. 12A is linear, thereby having a higher effect for suppressing color shift than FIG. 11B; this causes a decrease in brightness when viewed by eye or sensed with a measuring instrument, which leads to lower brightness than the case of FIG. 11B.

Since each of the three spatial frequency components f7 to f9 shown in FIG. 12B is a linear spatial frequency component, the light is diffused in multiple directions. Similarly to FIG. 12A, this improves the effect to suppressing color shift than FIG. 11B; this causes decrease in brightness when viewed through eyes or sensed with a measuring instrument, which leads to lower brightness than the case of FIG. 11B.

According to the only one dot-like spatial frequency component f10 shown in FIG. 12C, the light is diffused in a single direction, but the color shift cannot be restricted.

The embossed layer 46 may include a salt adsorbent. If the optical structure 40 includes the protection layer 49 as in FIG. 9B, at least one of the embossed layer 46 and the protection layer 49 includes a salt adsorbent.

Figure 13:
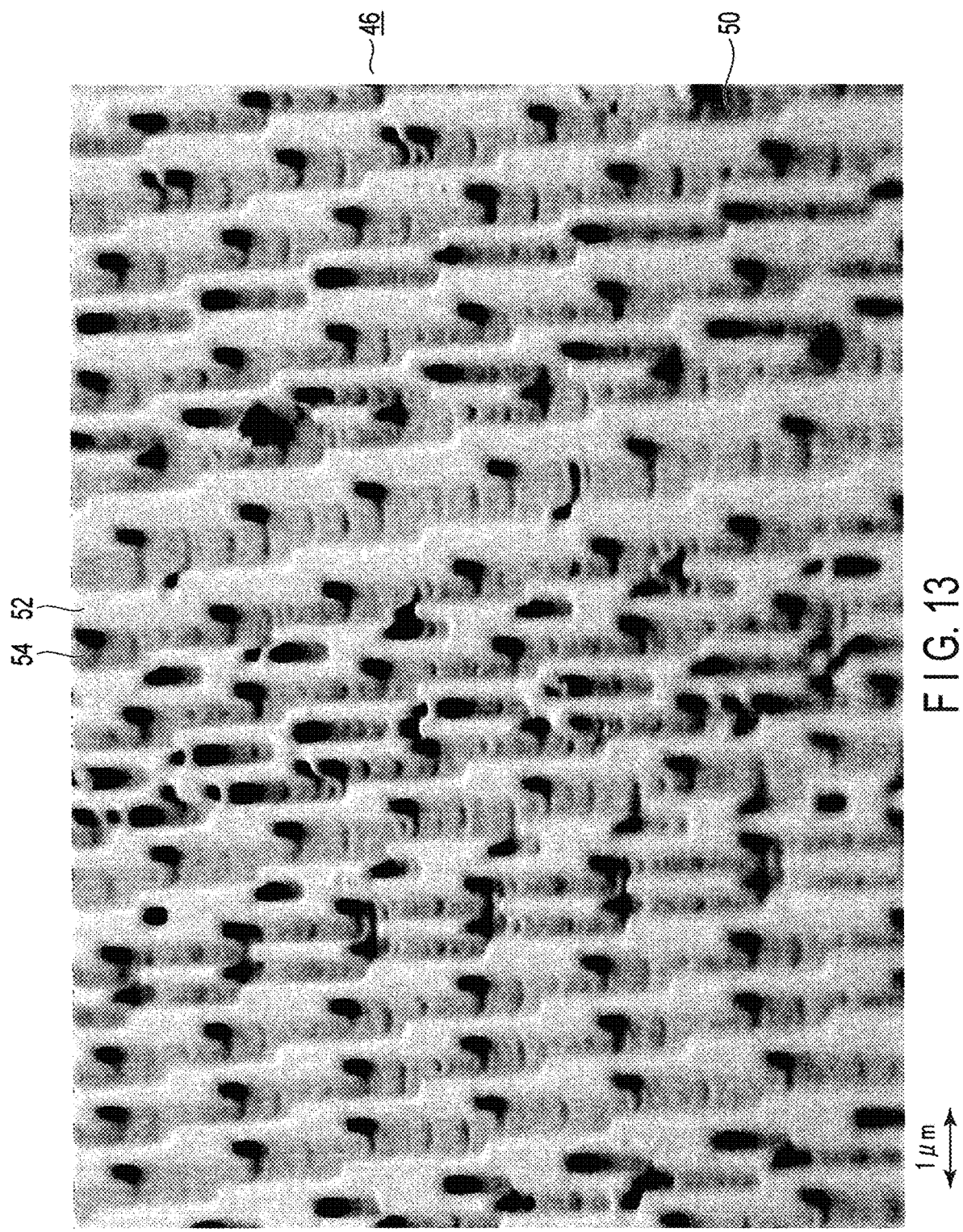
FIG. 13 is a micrograph obtained by observing a part of the surface of the quantization phase difference structure of the embossed layer with a scanning electron microscope.

FIG. 13 is a micrograph obtained by observing a part of the surface of the quantization phase difference structure 50 of the embossed layer 46 with a scanning electron microscope.

In the quantization phase difference structure 50, ribbed projecting portions as one element structure, in which quantization projecting portions in a constant size are aligned in one direction, and groove-like recessed portions as the other element structure, in which quantization recessed portions in a constant size are aligned parallel to the ribbed projecting portions, are arranged adjacently and alternately. The depth from the top surface 52 of the quantization projecting portions of the ribbed projecting portions to the bottom surface 54 of the quantization recessed portions of the groove-like recessed portions is constant, and the structure is quantized into the element structures of the quantization projecting portion and the quantization recessed portion. The surface roughness of the bottom surface 54 of the quantization recessed portion of the quantization phase difference structure 50 is greater than the surface roughness of the top surface 52 of the quantization projecting portion, and the diffraction light of the quantization phase difference structure 50 reproduces a plurality of reproduction points discrete in one direction.

If the embossed layer 46 has many spatial frequency components, the surface of the quantization phase difference structure 50 of the embossed layer 46 has a structure that is regular to some extent but is complicated as shown in FIG. 13. In the embodiment of the present invention shown in FIG. 13, the bottom surface 54 of the quantization recessed portions of the quantization phase difference structure 50 have a constant depth, and the variation in the depth of the bottom surface 54 of the quantization recessed portions is equal to or less than a 10th of the length L. The surface of the bottom surface 54 of the quantization recessed portion may be rough.

The material of the embossed layer 46 can be thermoplastic resin such as urethane resin, polycarbonate resin, polystyrene resin, polyvinyl chloride resin, etc., thermoset resin such as unsaturated polyester resin, melamine resin, epoxy resin, urethane (meta-)acrylate, polyester (meta-)acrylate, epoxy (meta-)acrylate, polyol (meta-)acrylate, melamine (meta-)acrylate, triazine (meta-)acrylate, etc., a composite thereof, or a thermoformable material having a radical polymerizable unsaturated group, for example.

The reflection layer 48 may be formed by applying an ink. In accordance with the printing method, this ink may be an offset ink, a letterpress ink, a gravure ink, etc. In accordance with the difference of ink resolvent, this ink may be a solventless ink, an oil-based ink, or a water-based ink. In accordance with different drying methods, this ink may be an oxidation polymerization ink, a penetration drying ink, an evaporation drying ink, or an ultraviolet curing ink.

The reflection layer 48 may be a functional ink of which color shifts in accordance with the illumination angle or the observation angle. As such a functional ink, an optical variable ink, a color-shifting ink, and a pearl ink can be used.

The reflection layer 48 can be metal or a metal compound. The metal compound may be $TiO_2$, $Si_2O_3$, $SiO$, $Fe_2O_3$, $ZnS$, etc. These metal compound has a high refractive index, and easily has high reflectivity. The metal may be Al, Ag, Sn, Cr, Ni, Cu, Au, etc. It is easy to increase the reflectivity of these metals.

Furthermore, the reflection layer 48 may have magnetism.

The protection layer 49 can be made of the same kind of material as the embossed layer 46. The protection layer 49 may be made of the same material as the embossed layer 46. If the protection layer 49 is made of the same material as the embossed layer 46, the refractive index can be set to be the same as the embossed layer 46, and thus the colors on the front and back sides of the optical structure 40 can be set to be the same.

An optical layer (not shown) that reflects the visible light and transmits infrared light may be further laminated on the optical structure 40.

In the optical structure 40, the structural colors of the embossed layer 46 and the reflection layer 48 preferably have a reflectance spectrum that has a peak at least in the wavelength region from 800 nm to 1000 nm.

The optical structure according to the embodiment of the present invention is produced by peeling the embossed layer 46 and the reflection layer 48, as materials for an optical structure, off of the carrier 42 of such optical structure 40 via the peeling layer 44, and making these materials for an optical structure into fine powder. The optical structure produced in such a manner is dispersed in resin, and applied as a printable ink.

Next, the effect of such optical structure according to the embodiment of the present invention will be described.

In the optical structure according to the embodiment of the present invention, the length L from the top surface 52 of the quantization projecting portion of the quantization phase difference structure 50 to the bottom surface 54 of the quantization recessed portion is constant regardless of the position on the surface of the embossed layer 46, and the light of a specific wavelength can be reflected more easily by adjusting the value of the length L.

Regarding the spatial frequency of the quantization phase difference structure 50, the color shift can be reduced and the color variation along with change in the observation direction and the illumination direction can be reduced by separately arranging the peak intensities of a plurality of spatial frequency distribution f1 to f5 along one direction or a plurality of directions in a plane, as shown in FIG. 11B.

Meanwhile, as shown in FIG. 12A, the color-shift effect can be also reduced in the case of linearly and continuously arranging the peak intensity of the spatial frequency component f6. In this case, the brightness and saturation of the color is reduced.

If the peak intensities of the spatial frequency components f7 to f9 are set to a plurality of directions (not only one direction) in a plane as shown in FIG. 12B, there are too many reflected directions of the light, which leads to reduction in brightness.

If the peak intensity of the spatial frequency component f10 is arranged in a single direction (not a plurality of directions) as shown in FIG. 12C, when the light is incident, only the diffraction light is reflected only in a specific direction. In other words, in the case as shown in FIG. 12C, the embossed layer 46 has the simple diffraction grating of a single pitch P as shown in FIG. 10; in this case, the number of reflected directions is too small, which leads to reduction of the entire brightness.

In the optical structure according to the embodiment of the present invention, as shown in FIG. 13, the surface roughness of the bottom surface 54 of the quantization recessed portion is high, which is equal to or less than a 10th of the length L. Thus, the reflected directions of the light can be diffused without changing the color by setting the quantization phase difference structure 50 to an extent not dependent on the wavelength of light.

As described above, the light with a specific wavelength can be reflected by adjusting the length L from the top surface 52 of the quantization projecting portion to the bottom surface 54 of the quantization recessed portion; if neither the top surface 52 of the quantization projecting portion nor the bottom surface 54 of the quantization recessed portion has any surface roughness, the length L fluctuate in accordance with the tolerance relative to the designed value, thereby fluctuating the color sensitively.

However, in the optical structure according to the embodiment of the present invention, since the bottom surface 54 of the quantization recessed portion in the embossed layer 46 has surface roughness, the color changing degree with respect to the length L reduces, which leads to moderation of tolerances. Such an effect is not limited to the effect exhibited by the surface roughness of the bottom surface 54 of the quantization recessed portion, but is also exhibited by the surface roughness of the top surface 52 of the quantization projecting portion, similarly.

Therefore, it is only necessary that the average surface roughness of either one of the top surface 52 of the quantization projecting portion or the bottom surface 54 of the quantization recessed portion is equal to or less than a 10th of the reference length L. An arithmetic average roughness (Ra) can be applied to the surface roughness. In other words, the arithmetic average roughness (Ra) is equal to or less than 0.1. The roughness may be equal to or more than a 100th of the length L. In other words, the arithmetic average roughness (Ra) is equal to or more than 0.01.

The surface roughness of the top surface 52 of the quantization projecting portion may be smaller than the surface roughness of the bottom surface 54 of the quantization recessed portion. In this case, the tolerances of the structural color can be reduced, and reduction of saturation of the structural color is suppressed. In other words, both of stability and chromogenic of the structural color and can be achieved. The surface roughness of the bottom surface 54 of the quantization recessed portion may be smaller than the surface roughness of the top surface 52 of the quantization projecting portion. In other words, the surface roughness of the top surface 52 of the quantization projecting portion is different from the surface roughness of the bottom surface 54 of the quantization recessed portion.

In the optical structure according to the embodiment of the present invention, the concave-convex direction of the quantization phase difference structure 50 (namely, the vertical direction in FIG. 10) is perpendicular to the extending direction of the ribbed recessed portion and the groove-like recessed portion formed by the top surface 52 of the quantization projecting portion and the bottom surface 54 of the quantization recessed portion, thereby scattering the light related to the structural color in the vertical direction in which the color tone of the light is not changed; accordingly, the optical structure according to the embodiment of the present invention can be realized even if there are manufacturing tolerances.

Moreover, if the optical structure according to the embodiment to the present invention is constituted by the optical structure 40 where the protection layer 49 is laminated as shown in FIG. 9B, the structural colors on the front and back sides of the optical structure may be set to the same by forming the protection layer 49 from a material having the same refractive index as the embossed layer 46.

If the reflection layer 48 is magnetic, it enables manufacturing by a method of curing a resin after the optical structure is oriented in a magnetic field in a specific direction; thus, it is possible to control the direction of the optical structure and to provide an optical effect deriving therefrom.

If the reflection spectra of the structural colors of the embossed layer 46 and the reflection layer 48 have a peak at least in the wavelength region from 800 to 1000 nm, it is possible to produce a printed material that looks black similarly to general printed materials printed in black under visible light but reacts to infrared light.

By using this characteristic, the optical structure according to the embodiment of the present invention can be applied to the degradation determination of a material such as concrete. If a material to be tested such as concrete includes the optical structure according to the embodiment of the present invention, the contrast between a cracked portion and an uncracked portion can be emphasized at the time of infrared light examination.

Deterioration of the reflection layer 48 due to salt in the air can be prevented by including a salt adsorbent in the embossed layer 46, or in at least one of the embossed layer 46 or the protection layer 49 if the protection layer 49 is provided as shown in FIG. 9B.

Figure 14:
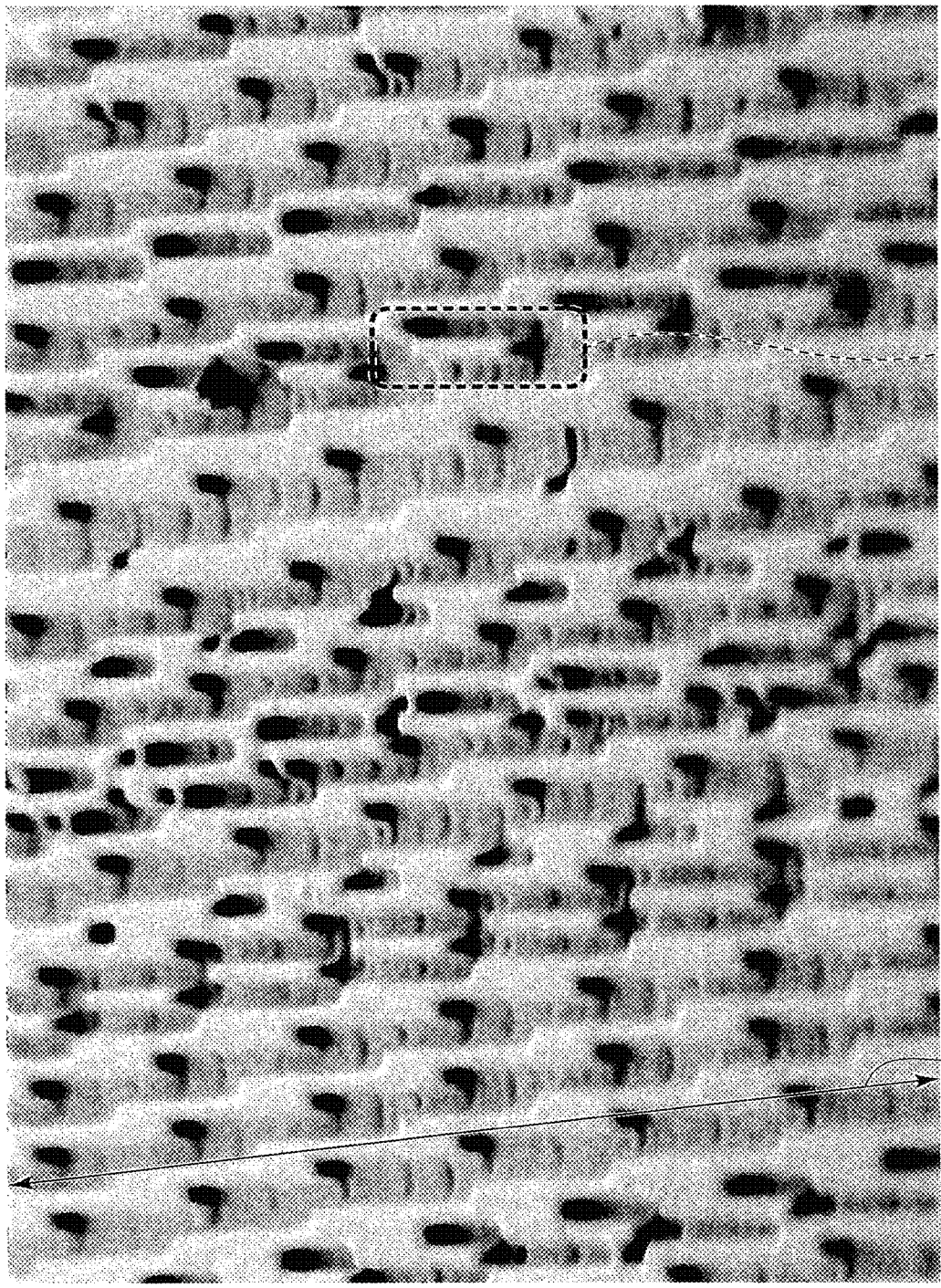
FIG. 14 is a diagram where explanations are added to the micrograph shown in FIG. 13.

As shown in FIG. 14 where explanations are added to FIG. 13, projecting portions and recessed portions of constant length L are aligned in one direction, thereby providing interfering and diffraction function, setting the bottom surface 54 of the quantization recessed portions of the quantization phase difference structure 50 to be rough, and providing excessive scattering characteristics. Accordingly, stable highly-bright chromogenic can be realized by highly-bright color development of interference and diffraction and the scattering characteristics by the rough surface. Since the quantization phase difference structure 50 has a quantization structure based on the element structure, it is possible to eliminate extremely small structures and extremely large structures that are difficult to be formed.

An ink that does not fade even after time passes can be realized by applying flakes of the optical structure according to the embodiment of the present invention as pigments of the ink for a printed material required to have high durability. Since this ink can eliminate the color-shift effect in a specific direction, this ink can also realize a color tone that does not easily change as seen from any direction. Therefore, it is quite preferable for use as identification means for authentication for forgery of securities such as gift vouchers, credit cards, brand-name products, and equipment components.

If the optical structure according to the embodiment of the present invention is applied to an ink for infrared light, the ink is normally invisible to the human eye but can be detected by an infrared detector, etc. Based on this fact, the ink for infrared light can be utilized for detecting cracks of concrete with infrared light by including the ink in concrete.

Patent Literature 3 (WO 2007/131375) discloses the technique of developing colors by interference between the top surface 52 of the quantization projecting portion and the bottom surface 54 of the quantization recessed portion similarly to the quantization phase difference structure 50 shown in FIG. 13 and FIG. 14. However, the configuration disclosed in Patent Literature 3 has a constant relief height but has uneven widths. Thus, the configuration disclosed in Patent Literature 3 has a disadvantage that bad formation easily occurs in wide portions and narrow portions. However, in the quantization phase difference structure 50 shown in FIG. 13 and FIG. 14, such bad formation does not occur since the relief width is constant.

According to such optical structure according to the embodiment of the present invention, the image is not in a rainbow color as in the conventional diffraction grating, as shown in FIG. 15, and a brighter image than the image realized in the Patent Literature 3 can be obtained.

Example

Next, an example in which the optical structure according to the embodiment of the present invention as described above is actually produced, its characteristics are checked, and it is applied to concrete deterioration detection, will be described below.

(Production of Optical Structure)

In order to produce the optical structure according to the embodiment of the present invention, first, the embossed layer 46 is designed. Specifically, 90 spatial frequency components are separately arranged on the quantization phase difference structure 50, and the embossed layer 46 is designed so that adjacent rays of light are about 2 degrees apart and the light spreads in a direction of 180 degrees in a planar manner when the light is vertically incident.

Next, a positive resist having a film thickness of 0.6 μm is applied on a glass original plate, and the quantization phase difference structure 50 is drawn on the positive resist surface by using an electron beam drawing device. The dose amount of positive resist to be applied is determined by adjustment so that the length of the positive resist is around 220 nm.

After that, a conductive thin film of Ni is provided by a sputtering method on the glass original plate on the side where the quantization phase difference structure 50 is formed by image development. Then, the conductive thin film is plated with Ni, and the conductive thin film of Ni is peeled off the glass original plate to produce a duplicate plate, thereby obtaining an embossing plate.

Next, a peeling layer 44 is provided by applying Denka Poval (registered trademark) (polyvinyl alcohol) one surface of a polyester film (Toray industries, Inc., product name: "Lumirror 19528"), which has a thickness of 19 μm and used as the carrier 42, by the gravure coating method so that the film thickness of Denka Poval after drying is 2 μm.

Then, the embossed layer 46 is formed on the peeling layer 44 by applying UV-curable resin ("POLYSTER" produced by Washin Chemical Industry CO., LTD.) to have a film thickness of 2 μm on the peeling layer 44, pressing the above-described embossing plate on the application surface, and irradiating ultraviolet light of 200 mJ/cm² from a side of the surface of the polyester film as the carrier 42, on which the peeling layer 44 is not applied, to cure the UV-curable resin. This embossing plate is peeled off, thereby forming the embossed layer 46 including the quantization phase difference structure 50 on the peeling layer 44.

Furthermore, the reflection layer 48 covering the embossed layer 46 is formed by forming an Al deposited thin layer of a film thickness of 50 nm over the entire surface of the embossed layer 46.

Moreover, the protection layer 49 is formed by applying UV-curable resin to have a film thickness of 2 μm again on the reflection layer 48 ("POLYSTER 200" produced by Washin Chemical Industry CO., LTD.). In this manner, the embossed layer 46 and the protection layer 49 are formed of the same material.

An optical structure formed in this manner is immersed in a liquid to dissolve the peeling layer 44, thereby separating an optical structure material including the embossed layer 46, the reflection layer 48, and the protection layer 49 from the carrier 42.

The optical structure material is then immersed in a MEK solvent and separated into pieces; after that, the optical structure material is pulverized with a planetary mill, thereby producing optical structures. The grain diameter of this optical structure is about φ20 μm as observed with a stereomicroscope.

(Characteristic Feature)

The optical structures formed in the above manner are dispersed at 30 W % in the UV-curable resin, applied on PET with an applicator to have a dry film thickness of 100 μm, and cured by UV light, so that reflected light of which color is shifted to blue is visually confirmed.

(Application to Concrete Degradation Detection)

In order to apply the optical structure as described above to concrete degradation detection, a concrete test body A of 50 cubic centimeters is produced by mixing cement, sand, gravel, and optical structure in the ratio of 1:3:1:3, and adding an appropriate amount of water while stirring the mixture.

Next, a concrete test body B of 50 cubic centimeters is produced by mixing cement, sand, and gravel in the ratio of 1:3:1 without mixing the optical structure, and adding an appropriate amount of water while stirring the mixture.

A hole of φ30 mm and depth of 15 mm is formed on the back side of each of the concrete test bodies A and B, and an infrared photograph of each of the concrete test bodies A and B is taken by using the infrared thermograph TVS-500 of Nippon Avionics Co., Ltd.

As a result, a shape of the hole is not identified in a concrete test body B into which the optical structure is not mixed; however, a shape of the round hole is confirmed in a concrete test body A into which the optical structure is mixed. Deformation due to temperature differences is also confirmed.

In this manner, it is confirmed that the optical structure according to the embodiment of the present invention facilitates shape measurement of concrete, and can be applied to degradation determination.

In the above, the embodiments for implementing the present invention are described with reference to the attached drawings; however, the present invention is not limited to the described configuration. The embodiments of the present invention can be combined, so that a synergistic effect can be obtained. Various modifications and corrections can be conceived by a person skilled in the art within the scope of the technical idea of the inventions of the claims, and the modifications and corrections are understood as belonging to the technical scope of the present invention.

The invention claimed is:

1. An optical structure comprising:
    a quantization phase difference structure in which,
        a plurality of quantization projecting portions in a constant size and a plurality of quantization recessed portions in a constant size are aligned, on one surface of a quantization phase difference structure layer, and
        a multiple diffraction region is arranged, the multiple diffraction region having the quantization phase difference structure where ribbed projecting portions, in which the plurality of quantization projecting portions are aligned in one direction, are arranged adjacent to and alternately with grooved recessed portions, in which the quantization recessed portions are aligned parallel to the ribbed projecting portions,
        the quantization phase difference structure to reproduce a plurality of reproduction points discrete in one direction and arranged regularly.

2. The optical structure according to claim 1, wherein surface roughness of a bottom surface of the quantization recessed portions of the quantization phase difference structure is different from surface roughness of a top surface of the quantization recessed portions of the quantization phase difference structure.

3. The optical structure according to claim 1, wherein the multiple diffraction region includes a plurality of multiple diffraction regions arranged regularly in the quantization phase difference structure.

4. The optical structure according to claim 3, wherein a multiple diffraction region, from among the plurality of multiple diffraction regions, has a direction of a spatial frequency component determined in accordance with a direction toward which an inclined surface of a projecting structure in the multiple diffraction region faces.

5. The optical structure according to claim 4, wherein the plurality of reproduction points are reproduced from the spatial frequency component, and wherein a shortest distance R from the plurality of reproduction points to a plane where the reproduction points are provided satisfies a relationship of $R > D^2/\lambda$, where D is an entire length of the multiple diffraction region and λ is a wavelength of light in the multiple diffraction region.

6. The optical structure according to claim 5, wherein an incident light vector perpendicular to the plane is $\vec{I} = (0, 0, -1)$, and a normal vector relative to an inclined surface of a polygon in a phantom 3D shape constructed on the plane is $\vec{n}$, an angle between $-\vec{I}$ and the normal vector $\vec{n}$ is θ1, an angle between an alignment direction $\vec{a}$ of the plurality of reproduction points, and the normal vector $\vec{n}$ is θ2, and if θ1=θ2=θ, the plurality of reproduction points are distributed in accordance with the alignment direction $\vec{a} = \vec{1} + 2\cos(\theta)\cdot\vec{n}$.

7. The optical structure according to claim 6, wherein light intensity distribution of the plurality of reproduction points is obtained such that, among the plurality of reproduction points, a reproduction point existing in a direction in which incident light is reflected on the inclined surface of the polygon in a specular manner has a highest light intensity, and a reproduction point shifted further from the direction in which the incident light is reflected in a specular manner has a lower light intensity.

8. The optical structure according to claim 6, wherein the plurality of reproduction points are arranged at an irregular interval in a space.

9. The optical structure according to claim 3, wherein the multiple diffraction region is of a cell type.

10. The optical structure according to claim 3, wherein a depth of the quantization phase difference structure is different for each of the multiple diffraction regions.

11. The optical structure according to claim 3, the optical structure comprising a reflection layer on a surface of the quantization phase difference structure.

12. An authentication body comprising the optical structure according to claim 1.

* * * * *

UNITED STATES PATENT AND TRADEMARK OFFICE
CERTIFICATE OF CORRECTION

PATENT NO. : 11,247,505 B2
APPLICATION NO. : 16/752108
DATED : February 15, 2022
INVENTOR(S) : Akihito Kagotani et al.

Page 1 of 1

It is certified that error appears in the above-identified patent and that said Letters Patent is hereby corrected as shown below:

In the Claims

Column 24, Line 58, In Claim 5, delete "A is" and insert --$\lambda$ is--.

Signed and Sealed this
Tenth Day of May, 2022

*Katherine Kelly Vidal*

Katherine Kelly Vidal
*Director of the United States Patent and Trademark Office*